(12) United States Patent
Sato et al.

(10) Patent No.: US 10,324,448 B2
(45) Date of Patent: Jun. 18, 2019

(54) PATH CALCULATION PROGRAM, PROCESSING APPARATUS, PATH CALCULATION METHOD, TOOL, AND PROCESSED ARTICLE

(71) Applicant: XEBEC TECHNOLOGY CO., LTD., Tokyo (JP)

(72) Inventors: Youichi Sato, Tokyo (JP); Takashi Maekawa, Kanagawa (JP); Takato Sato, Kanagawa (JP)

(73) Assignee: XEBEC TECHNOLOGY CO., LTD., Tokyo (JP)

( * ) Notice: Subject to any disclaimer, the term of this patent is extended or adjusted under 35 U.S.C. 154(b) by 0 days.

(21) Appl. No.: 15/551,426

(22) PCT Filed: Feb. 18, 2016

(86) PCT No.: PCT/JP2016/054714
§ 371 (c)(1),
(2) Date: Aug. 16, 2017

(87) PCT Pub. No.: WO2016/133162
PCT Pub. Date: Aug. 25, 2016

(65) Prior Publication Data
US 2018/0039251 A1 Feb. 8, 2018

(30) Foreign Application Priority Data
Feb. 18, 2015 (JP) .................. 2015-030108

(51) Int. Cl.
*B23C 3/12* (2006.01)
*G05B 19/18* (2006.01)
(Continued)

(52) U.S. Cl.
CPC .............. *G05B 19/402* (2013.01); *B23C 3/12* (2013.01); *G05B 19/182* (2013.01); *G05B 19/19* (2013.01);
(Continued)

(58) Field of Classification Search
None
See application file for complete search history.

(56) References Cited

U.S. PATENT DOCUMENTS 6,065,858 A     5/2000   Yamaguchi et al.
2010/0204814 A1* 8/2010  Neumaier ........ G05B 19/40937
                                                  700/97

(Continued)

FOREIGN PATENT DOCUMENTS

JP      03-3716 A      1/1991
JP      03-262009 A    11/1991
(Continued)

OTHER PUBLICATIONS

International Search Report in PCT/JP2016/054714 dated May 10, 2016.
(Continued)

*Primary Examiner* — Ryan A Jarrett
(74) *Attorney, Agent, or Firm* — Greenblum & Bernstein, P.L.C.

(57) ABSTRACT

Provided is a program of calculating a tool path that processes a workpiece having a complicated shape with use of an apparatus enabling multiaxial control in a program including a robot or the like with simple information input. A path calculation program for calculating a tool path for processing a curved processed part formed by a hole provided in a curved-surface-shaped workpiece functions as a workpiece shape information inputter configured to input workpiece shape information about a shape of the workpiece (Continued)

and a shape of the curve, a tool shape information inputter configured to input tool shape information about a shape of the tool, and a tool position calculator configured to calculate a tool position enabling a specified point on the curve to be processed by the tool based on the input workpiece shape information and tool shape information.

15 Claims, 25 Drawing Sheets

(51) Int. Cl.
  *G05B 19/19*   (2006.01)
  *G05B 19/402*   (2006.01)
  *G05B 19/4093*   (2006.01)

(52) U.S. Cl.
  CPC ... *G05B 19/4093* (2013.01); *G05B 19/40937* (2013.01); *G05B 2219/35167* (2013.01); *G05B 2219/45151* (2013.01); *G05B 2219/50343* (2013.01); *G05B 2219/50357* (2013.01)

(56) References Cited

U.S. PATENT DOCUMENTS

| | | | |
|---|---|---|---|
| 2012/0089242 A1 | | 4/2012 | Iriguchi et al. |
| 2015/0277436 A1* | | 10/2015 | Kalmar-Nagy ............................. G05B 19/40937 700/187 |
| 2015/0309499 A1* | | 10/2015 | Tezuka .................. G05B 19/19 700/184 |
| 2016/0282846 A1* | | 9/2016 | Nagaoka ................ B23Q 15/22 |

FOREIGN PATENT DOCUMENTS

| | | |
|---|---|---|
| JP | 2005-74523 A | 3/2005 |
| JP | 2005-271148 A | 10/2005 |
| JP | 2007-265237 A | 10/2007 |
| JP | 2013-101429 A | 5/2013 |
| JP | 2015-16541 A | 1/2015 |
| WO | 2011/004585 A1 | 1/2011 |

OTHER PUBLICATIONS

Asakawa N et al., "Automation of chamfering by an industrial robot; for the case of hole on free-curved surface", Robotics and Computer Integrated Manufacturing, Elsevier Science Publishers, vol. 18, No. 5-6, Oct. 1, 2002, pp. 379-385.

Kwok K S et al., "Automatic tool path generation for finish machining", Robotics and Automation, 1997, Proceedings., 1997 IEEE International Conference on Albuqueroue, NM, USA Apr. 20-25, IEEE, New York, NY, USA, vol. 2, Apr. 20, 1997, pp. 1229-1234.

Sato Takato et al., "Tool path generation for chamfering drill holes of a pipe with constant width", Computer Aided Design, Elsevier Publishers, vol. 78, May 6, 2016, pp. 26-35.

Official Communication issued in European Patent Office (EPO) Patent Application No. 16752548.4, dated Aug. 29, 2018.

* cited by examiner

BISECTED ANGLE

NON-BISECTED ANGLE

PATH CALCULATION PROGRAM, PROCESSING APPARATUS, PATH CALCULATION METHOD, TOOL, AND PROCESSED ARTICLE

TECHNICAL FIELD

The present invention relates to a path calculation program, a processing apparatus, a path calculation method, a tool, and a processed article.

BACKGROUND ART

At the time of processing, such as cutting and boring, of a workpiece with use of a working machine, an unnecessary protrusion called "burr" may be generated on a processed surface of the workpiece. When the burr remains in the workpiece, the burr causes a defect of the product and an injury of the worker. Thus, a process of removing the burr (hereinbelow referred to as deburring) or a process of cutting a corner in which the burr is generated (hereinbelow referred to as chamfering) needs to be performed. Such a process is performed by a working machine for numerical control (NC) processes. To perform the process with use of the working machine, an NC program (also referred to as NC data) is required. By person in charge's inputting data directly into the working machine or by using shape data of the workpiece designed by computer aided design (CAD) software, a route of a tool attached to the working machine needs to be specified by computer aided manufacturing (CAM) software.

Meanwhile, in a case of boring a hole in a part of the workpiece, the burr generated in an opening rim on the backside needs to be removed. Since processing the workpiece by turning the workpiece upside down is poor in operability, a cutting tool enabling the backside of the workpiece to be processed is proposed (for example, refer to Patent Literature 1). In this tool disclosed in Patent Literature 1, a blade is configured to twist in a reverse direction of rotation, and deburring and chamfering in a secondary opening rim generated on a backside of a cylinder can be performed smoothly.

CITATION LIST

Patent Literature

Patent Literature 1: JP 2015-16541 A

SUMMARY OF INVENTION

Technical Problem

However, in a workpiece in which a boring process has been performed on a curved surface of a cylinder or the like, for example, an opening rim generated by boring is formed in a continuous three-dimensional curve such as a so-called potato chip shape, not in a curve on a plane. Thus, a tool path is complicated, and deburring cannot be performed by a conventional working machine for NC processes.

The present invention has been made to solve such a problem. That is, an object of the present invention is to provide a program of calculating a tool path that processes a workpiece having a complicated shape with use of an apparatus enabling multiaxial control in a program including a robot or the like (hereinbelow referred to as a multiaxial control apparatus). Another object of the present invention is to provide a processing apparatus that moves a tool along a calculated path for a process and a method for calculating a tool path.

Solution to Problem

The present invention relates to a path calculation program for calculating in a computer apparatus a tool path for processing a curved processed part formed by a hole provided in a curved-surface-shaped workpiece, the program causing the computer apparatus to function as: a workpiece shape information inputter configured to input workpiece shape information about a shape of the workpiece and a shape of the curve; a tool shape information inputter configured to input tool shape information about a shape of the tool; and a tool position calculator configured to calculate a tool position enabling a specified point on the curve to be processed by the tool based on the input workpiece shape information and tool shape information, wherein the tool position calculator calculates the tool position with a plurality of points on the curve set as specified points to calculate the tool path.

The path calculation program preferably causes the computer apparatus to function as: a first tangent vector calculator configured to calculate a first tangent vector to the curve at the specified point on the curve; and an addition vector calculator configured to calculate an addition vector obtained by adding a second tangent vector, of an intersection line of a normal plane to the first tangent vector and including the specified point with a thick internal surface of a hole, to a third tangent vector, of an intersection line of the normal plane with the curved surface, at a predetermined ratio, wherein the tool position calculator preferably calculates the tool position that is located on a straight line extending from the specified point and including the calculated addition vector and enables the specified point to be processed by the tool based on the input tool shape information.

The predetermined ratio for adding the second tangent vector to the third tangent vector is preferably 1:1.

The program preferably causes the computer apparatus to function as: a width information inputter configured to input information about a width of a processed surface to be formed after being processed at the specified point; and a machining depth specifier configured to specify a machining depth by the tool based on an angle formed by the second tangent vector and the third tangent vector and the input information about the width, wherein the tool position calculator preferably calculates the tool position that is located on the straight line extending from the specified point and including the calculated addition vector based on the machining depth specified by the machining depth specifier.

The program preferably causes the computer apparatus to function as: a position determiner configured to determine whether or not the tool position calculated by the tool position calculator is in a range in which interference between the workpiece and the tool is generated; and a ratio updater configured to update the predetermined ratio in a case where it is determined by the position determiner that the tool position calculated by the tool position calculator is in the range in which interference between the workpiece and the tool is generated, wherein the addition vector calculator preferably calculates the addition vector by adding the second tangent vector to the third tangent vector at the predetermined ratio updated by the ratio updater.

The workpiece preferably has a cylindrical external shape and has on a side surface of the workpiece a columnar hole whose center axis is straight line which is perpendicular to a center axis of the cylinder, and the workpiece shape information preferably includes information about an outside diameter or an inside diameter of the cylinder and a diameter of the hole.

The workpiece preferably has a cylindrical external shape and has on a side surface of the cylinder a columnar hole, the columnar hole is preferably at an angle inclined against a center axis of the cylinder, and the workpiece shape information preferably includes information about an outside diameter or an inside diameter of the cylinder, a diameter of the hole, and information about an inclination angle of the column.

The workpiece preferably has a cylindrical external shape and has on a side surface of the cylinder a columnar hole, the columnar hole preferably has a center axis which is straight line, not intersecting with a center axis of the cylinder, and the workpiece shape information preferably includes information about an outside diameter or an inside diameter of the cylinder, a diameter of the hole, and information about a decentering amount, which is a shortest distance between the center axis of the cylinder and the center axis of the hole.

The workpiece preferably has a cylindrical external shape and has on a side surface of the cylinder a columnar hole, the program preferably causes the computer apparatus to function as: a specified point position calculator configured to calculate a position of the specified point on the curve based on the input workpiece shape information; an edge angle calculator configured to calculate an angle of an edge corner formed by the columnar hole at the specified point on the curve and the side surface of the cylinder based on the input workpiece shape information; and a contact direction specifier configured to specify a direction in which the tool is to contact the specified point on the curve based on the angle of the edge corner calculated by the edge angle calculator, and the tool position calculator preferably calculates the tool position enabling the specified point to be processed by the tool based on the input tool shape information and the direction specified by the contact direction specifier.

The program preferably causes the computer apparatus to function as: a machining width inputter configured to input a machining width at the specified point on the curve; and a machining depth specifier configured to specify a machining depth in a case of adopting the width input by the machining width specifier based on the direction in which the tool is to contact the specified point on the curve specified by the contact direction specifier, wherein the tool position calculator preferably calculates the tool position enabling the specified point to be processed by the tool based on the machining depth specified by the machining depth specifier.

The present invention relates to a processing apparatus for processing a workpiece by moving a tool based on a path calculated with the path calculation program.

The present invention relates to a path calculation method for calculating in a computer apparatus a tool path for processing a curved processed part formed by a hole provided in a curved-surface-shaped workpiece, including: inputting workpiece shape information about a shape of the workpiece and a shape of the curve; inputting tool shape information about a shape of the tool; and calculating a tool position enabling a specified point on the curve to be processed by the tool based on the input workpiece shape information and tool shape information, wherein the calculating the tool position is calculating the tool position with a plurality of points on the curve set as specified points to calculate the tool path.

The present invention relates to a tool including: a neck; and a blade connected to a tip end of the neck and formed in a spherical shape, wherein, in a case where an angle formed by a line segment connecting a center of the spherical shape of the blade to a tip end of the blade residing on an extension of a center axis of the neck and a line segment connecting the center of the spherical shape of the blade to a point on a surface of the blade is defined, the neck and the blade are connected in a range from a position at which the angle is 0 degrees to a position at which the angle is 137.5 degrees or more on the surface of the blade, and a ratio r/R of a radius r of the neck to a radius R of the blade formed in the spherical shape is 0.3 to 0.8.

The present invention relates to a processed article having a curved-surface external shape and having a curved edge portion formed by a hole provided in the curved surface, wherein a width of the edge portion is uniform, and an angle of a corner formed by the edge portion and a first adjacent surface and an angle of a corner formed by the edge portion and a second adjacent surface are equal.

A part in which the angle of the corner formed by the edge portion and the first adjacent surface and the angle of the corner formed by the edge portion and the second adjacent surface are not equal is preferably partially provided.

The present invention relates to a processing system for calculating a tool path for processing a curved processed part formed by a hole provided in a curved-surface-shaped workpiece, controlling the tool path in accordance with the calculated path, and processing the workpiece, the system including: a workpiece shape information inputter configured to input workpiece shape information about a shape of the workpiece and a shape of the curve; a tool shape information inputter configured to input tool shape information about a shape of the tool; and a tool position calculator configured to calculate a tool position enabling a specified point on the curve to be processed by the tool based on the input workpiece shape information and tool shape information, wherein the tool position calculator calculates the tool position with a plurality of points on the curve set as specified points to calculate the tool path, the system further includes a processor configured to process the workpiece by controlling the tool path in accordance with the calculated path, the tool includes a neck and a blade connected to a tip end of the neck, and the blade has a spherical segment part formed in a shape in which the sphere is partially cut by a surface.

Advantageous Effects of Invention

According to the present invention, it is possible to provide a program for calculating a tool path for processing a workpiece formed in a complicated shape with use of a multiaxial control apparatus with simple information input. As a result, even the workpiece formed in the complicated shape can be processed with use of the multiaxial control apparatus, and the efficiency of the processing can drastically be improved. Also, since an appropriate tool path can be calculated, abrasion of the tool can be restricted.

DESCRIPTION OF EMBODIMENTS

Hereinbelow, embodiments of the present invention will be described with reference to the drawings. Respective steps constituting a flowchart described below are in random order within a range in which inconsistency or mismatch does not occur in the content of the steps.

(Multiaxial Control Apparatus)

A multiaxial control apparatus used in an embodiment of the present invention will be described. The multiaxial control apparatus includes at least a control unit (central processing unit), a read only memory (ROM), a random access memory (RAM), and a display unit although these are not illustrated. The control unit of the multiaxial control apparatus reads a program stored in the ROM via a bus to control the entire multiaxial control apparatus. The RAM stores therein temporary calculation data, display data, and various data input by a person in charge through the display unit. The display unit displays information such as a menu allowing the person in charge to operate the multiaxial control apparatus and receives input of the person in charge through a key panel or the like allowing the person in charge to input an operation instruction. A below-mentioned computer apparatus may be the multiaxial control apparatus itself or may externally be connected to the multiaxial control apparatus.

(Workpiece)

Figure 1:
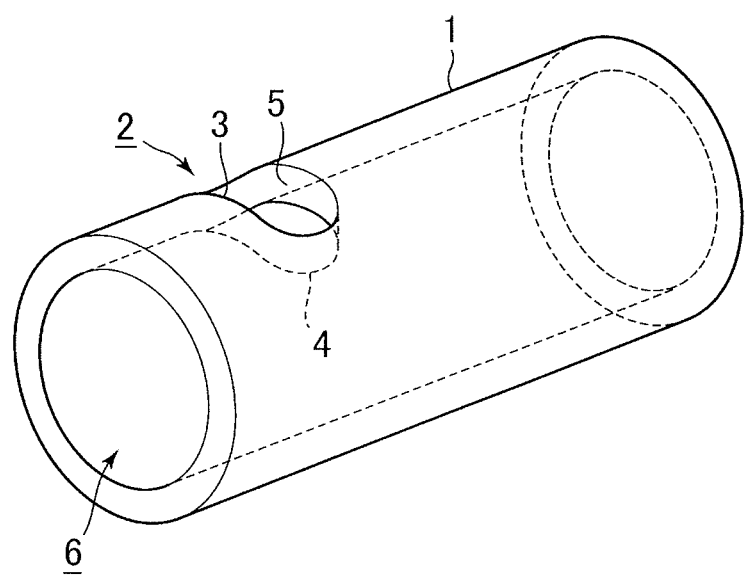
FIG. 1 illustrates a workpiece before being deburred according to an embodiment of the present invention.

Next, a workpiece used in an embodiment of the present invention will be described. FIG. 1 illustrates a workpiece before being deburred according to an embodiment of the present invention. As illustrated in the figure, as an exemplary embodiment, a cylinder having an approximately circular hole on a curved surface is a workpiece. A cylinder 1 has a columnar external shape and has therein a columnar cavity 6 having a precise-circular bottom surface analogous to a precise-circular bottom surface of the cylinder. The precise circle forming the bottom surface of the cylinder 1 and the precise circle forming the bottom surface of the cavity 6 have centers thereof at an equal position, and the side surface of the cylinder 1 has an equal thickness at any position.

A hole 2 is a hole penetrating from an external side surface of the cylinder 1 to the cavity 6. A center axis of the approximately columnar hole 2 is perpendicular to a center axis of the cylinder 1. By providing the hole 2, a primary opening rim 3 surrounding the hole 2 is formed on the external side surface of the cylinder 1, a secondary opening rim 4 surrounding the hole 2 is formed on an internal side surface of the cylinder 1 (a side surface on the side of the cavity 6), and a thick internal surface 5 serving as an inner wall of a side surface part of the cylinder 1 are formed. The shape of each of the primary opening rim 3 and the secondary opening rim 4 is a so-called potato chip shape.

Figure 2A:
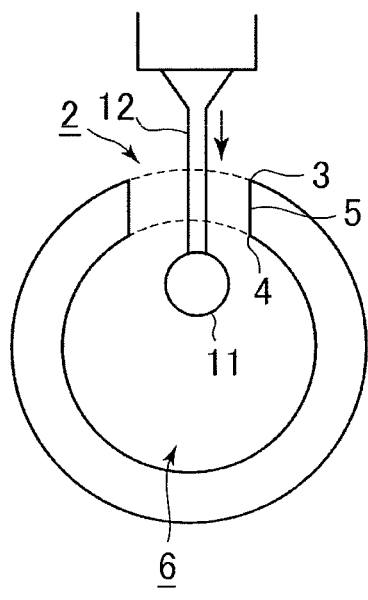
FIGS. 2(a) and 2(b) are schematic views illustrating a cross-section of a hole at the time of deburring according to an embodiment of the present invention.
Figure 2B:
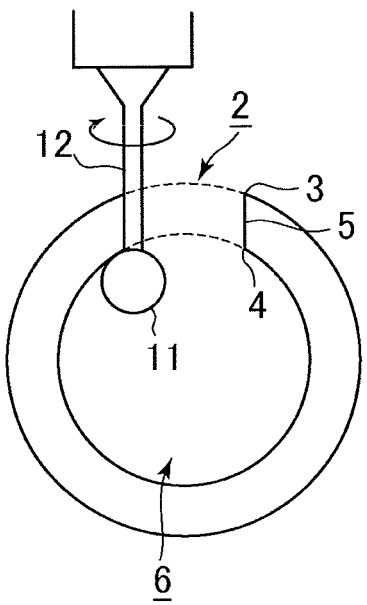

FIGS. 2(a) and 2(b) are schematic views illustrating a cross-section of the hole at the time of deburring according to an embodiment of the present invention. A blade 11 has hardness enabling a process such as deburring and is assumed to be a part of a tool that can be attached to the multiaxial control apparatus. As illustrated in FIG. 2(a), the blade 11 is inserted from the side of the primary opening rim 3 of the hole 2. The blade 11 is connected to the multiaxial control apparatus via a neck 12. The tool is rotated to cause the blade 11 to process a processed part. The shape of the blade 11 is not limited to a precise circular shape and may be any shape as long as the blade 11 can contact and process a burr generated in the secondary opening rim 4 as illustrated in FIG. 2(b). The blade 11 can also move in a horizontal direction and in a vertical direction along with movement of the neck 12 of the multiaxial control apparatus.

(Tool)

Figure 3A:
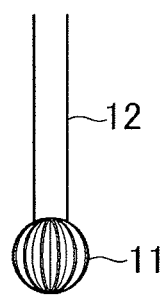
FIGS. 3(a) and 3(b) illustrate an example of a blade of a tool according to an embodiment of the present invention.
Figure 3B:
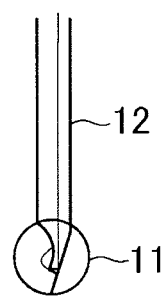

A tool used in the present invention is not limited and can be anything as long as the tool can process a workpiece through rotation. FIGS. 3(a) and 3(b) illustrate an example of a blade of the tool according to an embodiment of the present invention. FIG. 3(a) is a tool having the approximately spherical blade 11, having a plurality of dents on the surface of the sphere, and having a blade tip at the projection. In a tool in FIG. 3(b), the blade 11 is formed in a disk shape, and the front surface and the back surface are in equal shapes. The right portion of the blade 11 illustrated in FIG. 3(b) is the blade tip, and a portion closer to the blade tip is thinner. In each of the tools, the blade tip is in an approximately spherical shape when the tool is rotated, and the tool can process a processed part even when the processed part is located close to the neck 12. It is to be noted that at least the diameter of the blade 11 needs to be shorter than the diameter of the hole 2.

Figure 17A:
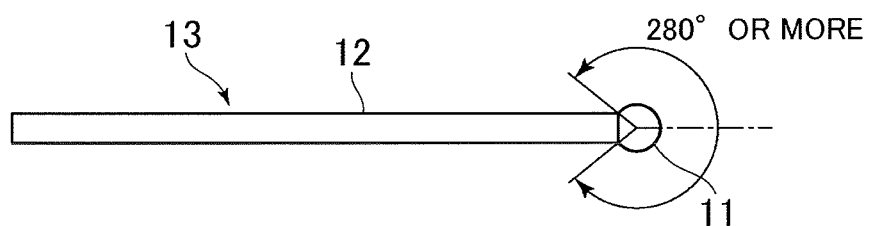
FIGS. 17(a) and 17(b) illustrate an example of the blade of a tool according to an embodiment of the present invention.
Figure 17B:
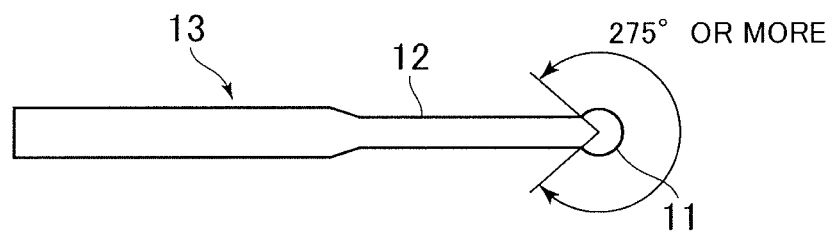

FIGS. 17(a) and 17(b) illustrate an example of the blade of a tool according to an embodiment of the present invention. A tool 13 used in the present invention favorably includes the neck 12 and the spherical blade 11 connected to the tip end of the neck 12. The blade 11 may be connected at a part thereof (the left end in FIGS. 17(a) and 17(b)) to the neck 12 and may be in a spherical segment shape, not in a perfect spherical shape. Consider a case where an angle formed by a line segment connecting a center of the spherical shape of the blade 11 to a tip end of the blade 11 residing on an extension of a center axis of the neck 12 and a line segment connecting the center of the spherical shape of the blade 11 to a point on the surface of the blade 11 is defined. As illustrated in FIG. 17(b), in the tool 13, the neck 12 and the blade 11 are favorably connected in the range from a position at which the angle is 0 degrees to a position at which the angle is 137.5 degrees or more on the surface of the blade 11. Also, as illustrated in FIG. 17(a), the neck 12 and the blade 11 are more favorably connected in the range from the position at which the angle is 0 degrees to a position at which the angle is 140 degrees or more on the surface of the blade 11. The neck 12 may have a structure in which the diameter is larger than the tip end halfway in a discontinuous manner as illustrated in FIG. 17(b) or in which the diameter is uniform or gradually longer.

The blade 11 is in the range from the position at which the angle is 0 degrees to the position at which the angle is 137.5 degrees or more on the surface of the blade 11. Thus, for example, in a case where the secondary opening rim 4 on the internal side surface of the cylinder 1 having the circular hole 2 on the curved surface is to be processed as illustrated in FIG. 1, the secondary opening rim 4 can be processed at a higher position of the blade 11. Accordingly, the secondary opening rim 4 can be processed while the neck 12 of the rotation tool is restricted from interfering with the workpiece.

Also, a ratio r/R of a radius r of the neck 12 to a radius R of the spherical blade 11 is favorably 0.3 or more and more favorably 0.5 or more. When the ratio r/R is less than 0.3, the blade 11 is too much larger than the neck 12, the rigidity is lowered, and a problem such as vibration due to load during the process may occur. The ratio r/R is favorably 0.8 or less and more favorably 0.7 or less. When the ratio r/R is more than 0.8, the radius of the neck 12 is too much longer than the radius of the blade 11. Thus, for example, in a case where the primary opening rim on the external side surface of the cylinder 1 having the circular hole 2 on the curved surface is to be processed in an angle bisecting direction as illustrated in FIG. 19(b), the neck 12 of the tool 13 is liable to interfere with the workpiece.

As described above, the tool used in the present invention includes the neck and the blade connected to the tip end of the neck, and the blade may have a spherical segment part formed in a shape in which the sphere is partially cut by a flat surface or a curved surface. For example, the spherical segment part included in the blade may be formed in a hemispherical shape or a shape in which the half or more of the sphere is cut. The tool in which the spherical segment part included in the blade is formed in the hemispherical shape or the shape in which the half or more of the sphere is cut can be used in a case where the primary opening rim on the external side surface of the cylinder 1 having the circular hole 2 on the curved surface is to be processed from the external side of the cylinder 1.

(Path Calculation Program)

Figure 4:
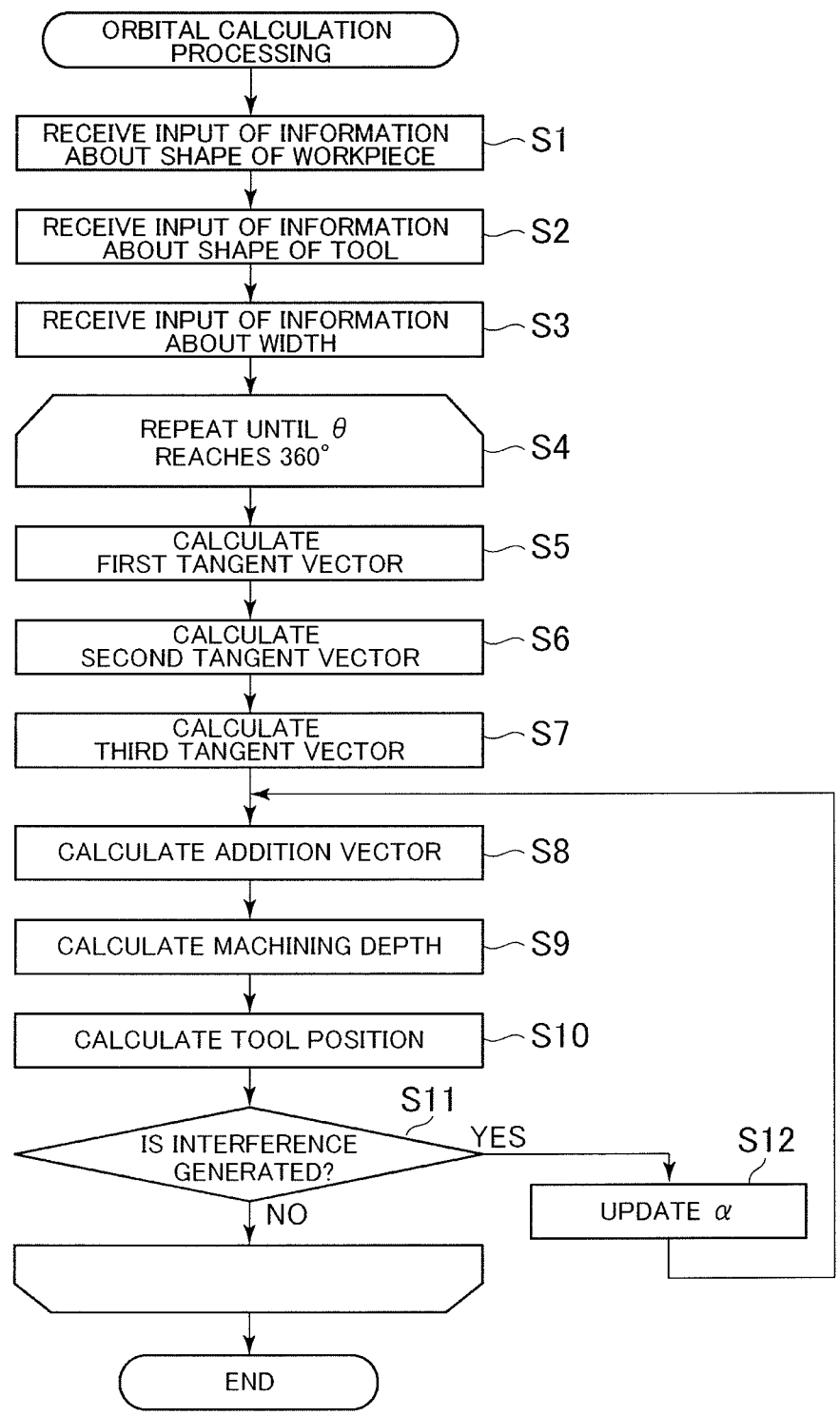
FIG. 4 is an example of a flowchart of path calculation processing according to an embodiment of the present invention.

Next, a path calculation program configured to calculate in the computer apparatus a tool path adapted to perform a process such as deburring will be described. FIG. 4 is an example of a flowchart of path calculation processing according to an embodiment of the present invention.

First, the computer apparatus receives input of information about a shape of a workpiece (step S1). The information about the workpiece at least includes an outside diameter or an inside diameter of the cylinder 1, a diameter of the hole 2, and positional coordinates of a center position of the hole 2.

Subsequently, the computer apparatus receives input of information about a shape of a tool (step S2). The information about the tool includes a radius of the tool sphere and a shank radius of the neck. For example, in a case where the blade 11 is formed approximately in a spherical shape, a radius of the sphere is input as the radius of the tool sphere. Also, in a case where the blade 11 has a twisted cutting blade, a radius of a virtual tool sphere formed by an external path of the cutting blade as a result of rotation of the blade 11 is input.

Subsequently, the computer apparatus receives input of information about a width of a processed surface in a case of chamfering (step S3). In a case where the width of the processed surface is not uniform and changes depending on the position in the secondary opening rim 4, stress will concentrate on a corner, which will cause a crack in the product. Thus, the width of the processed surface is favorably uniform regardless of the position in the secondary opening rim 4.

As described below, in steps S5 to S12, processing for calculating a position of the tool corresponding to an arbitrary point on the secondary opening rim 4 to be processed (an arbitrary point on a curve C ($\theta$)) is repetitively executed. The processing in steps S5 to S12 is repetitively executed while the value of $\theta$ is changed in a small range in a discontinuous manner in the range from 0 to 360 degrees. In step S4, whether or not the processing in steps S5 to S12 is executed until the value of $\theta$ is 360 degrees is performed.

To deburr the secondary opening rim 4, a shape of a curve forming the secondary opening rim 4 needs to be clarified, and a position of the tool along the curve needs to be calculated. The curve forming the secondary opening rim 4 can be an intersection line of an internal side surface forming the cavity 6 of the cylinder 1 serving as a workpiece with a side surface of a column containing the hole 2 (a conceptual column).

Figure 5:
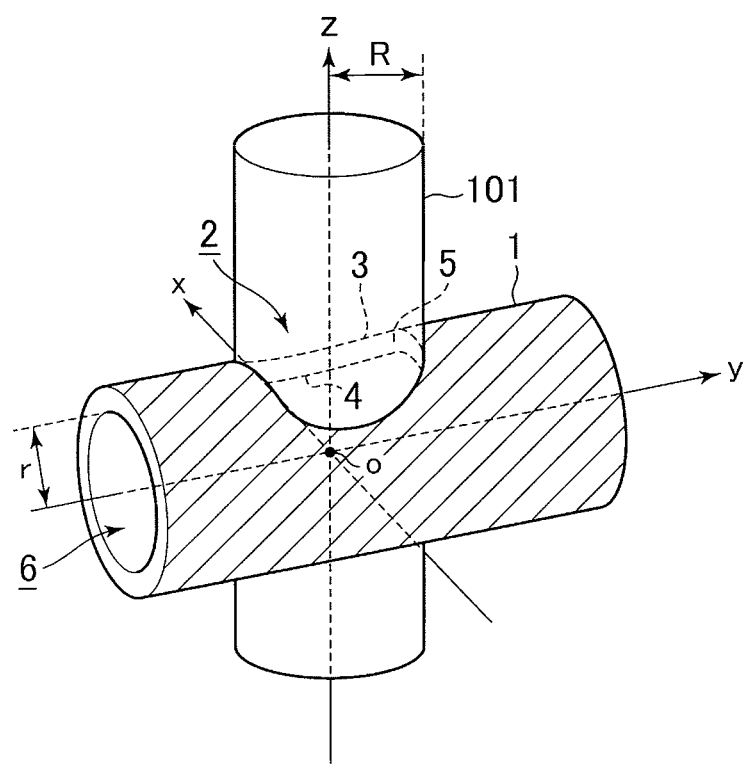
FIG. 5 is a conceptual view illustrating a state in which a cylindrical workpiece and a conceptual column forming a hole intersect according to an embodiment of the present invention.

FIG. 5 is a conceptual view illustrating a state in which a cylindrical workpiece and a conceptual column forming a hole intersect according to an embodiment of the present invention. A column 101 is a conceptual column containing the hole 2 of the cylinder 1 and having a cross-section formed in an equal shape to that of the hole 2. Here, an axis along a center of a circle of the column 101 is referred to as a z axis, an axis along a center of a circle of the cylinder 1 is referred to as a y axis, and a point at which the y axis and the z axis intersect is referred to as a reference point. Also, an axis perpendicular to the y axis and the z axis, extending from the near side to the backside in FIG. 5, and passing the reference point is referred to as an x axis.

In this case, positional coordinates of an external side of the column 101 having a radius R centering on the z axis can be expressed by parametric expression using a parameter $\theta$ as in Formula (1).

[Mathematical Formula 1]

$$x=R\cos\theta, y=R\sin\theta, z=z \quad (1)$$

Also, positional coordinates of an internal side surface of the cylinder 1 can be expressed by implicit function expression as in Formula (2).

[Mathematical Formula 2]

$$x^2+z^2=r^2 \quad (2)$$

Accordingly, a z coordinate of the intersection line of the internal side surface forming the cavity 6 of the cylinder 1 with the side surface of the column 101 can be derived in the following manner by substituting Formula (1) into Formula (2).

[Mathematical Formula 3]

$$z=\pm\sqrt{r^2-R^2\cos^2\theta}$$

From the above, the curve C ($\theta$), which is the intersection line of the internal side surface of the cylinder 1 with the side surface of the column 101, can be expressed with use of the parameter $\theta$ as in Formula (3).

[Mathematical Formula 4]

$$C(\theta) = \begin{pmatrix} R\cos\theta \\ R\sin\theta \\ \pm\sqrt{r^2-R^2\cos^2\theta} \end{pmatrix} \quad (3)$$

Meanwhile, in a case where the z coordinate is positive, the z coordinate is for an intersection line located on the upper side out of the intersection line of the internal side surface of the cylinder 1 with the side surface of the column 101 in FIG. 5. In a case where the z coordinate is negative, the z coordinate is for an intersection line located on the lower side out of the intersection line of the internal side surface of the cylinder 1 with the side surface of the column 101.

Further, a unit tangent vector t of the curve C ($\theta$) can be calculated by taking the first-order derivative of C ($\theta$) with respect to the parameter $\theta$. That is, the unit tangent vector t can be calculated by Formula (4).

[Mathematical Formula 5]

$$t = \frac{\dot{C}(\theta)}{|\dot{C}(\theta)|} \quad (4)$$

In the above manner, based on an inside radius r of the cylinder 1 and the radius R of the column 101 (that is, the radius R of the hole 2), a first tangent vector t at an arbitrary point on the curve C ($\theta$) is calculated (step S5).

Figure 6:
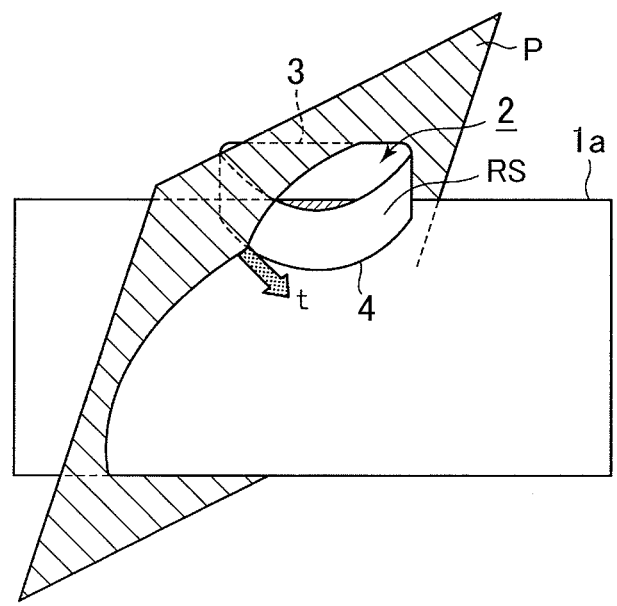
FIG. 6 is a conceptual view illustrating intersection of a cylinder with a normal plane according to an embodiment of the present invention.

Subsequently, an angle at which the tool contacts a processed part at an arbitrary point on the curve C ($\theta$) constituting the secondary opening rim 4 to be processed needs to be calculated. FIG. 6 is a conceptual view illustrating intersection of a cylinder with a normal plane according to an embodiment of the present invention. The normal plane is a plane P passing through an arbitrary point on the curve C ($\theta$) constituting the secondary opening rim 4 with the unit tangent vector t as a normal. As is apparent from FIG. 6, an intersection line of an internal side surface 1a of the cylinder 1 with a ruled surface RS forming a thick internal surface 5 of the hole 2 is the secondary opening rim 4. To calculate an angle at which the tool contacts the processed part at an arbitrary point on the curve C ($\theta$), a tangent vector of an intersection line of the normal plane at the arbitrary point with the thick internal surface 5 (a second tangent vector) and a tangent vector of an intersection line of the normal plane with the internal side surface 1a of the cylinder 1 (a third tangent vector) need to be calculated.

Figure 7:
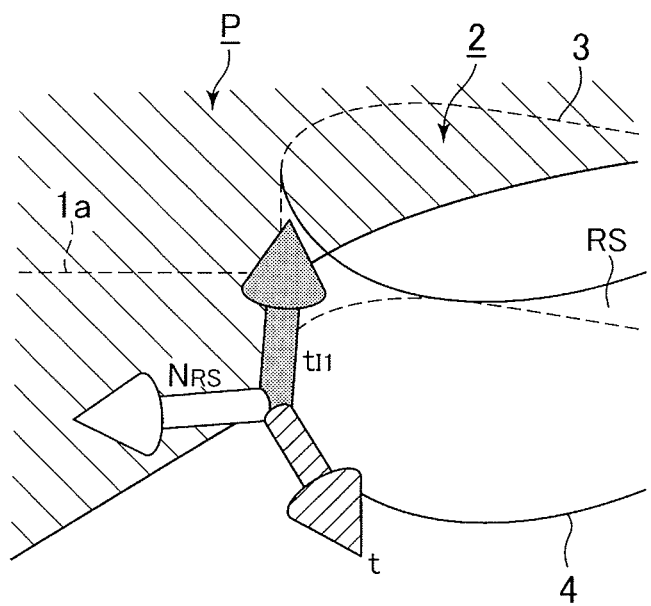
FIG. 7 is a conceptual view illustrating a relationship among a first tangent vector, a surface normal vector of a ruled surface, and a second tangent vector according to an embodiment of the present invention.

FIG. 7 is a conceptual view illustrating a relationship among the first tangent vector, a surface normal vector of the ruled surface, and the second tangent vector (unit tangent vector $t_{n}$) according to an embodiment of the present invention. Here, a normal vector $N_{RS}$ of the ruled surface RS can be expressed by Formula (5).

[Mathematical Formula 6]

$$N_{RS} = \begin{pmatrix} \cos\theta \\ \sin\theta \\ 0 \end{pmatrix} \quad (5)$$

Also, since a tangent vector of an intersection line between surfaces can be derived by an outer product (vector product) of normal vectors of the two surfaces, the unit tangent vector $t_{t1}$ can be expressed by an outer product (vector product) of the normal vector $N_{RS}$ of the ruled surface RS and the first tangent vector t as in Formula (6).

[Mathematical Formula 7]

$$t_{t1} = N_{RS} \times t \quad (6)$$

In the above manner, the second tangent vector $t_{t1}$ at the arbitrary point on the curve C ($\theta$) is calculated (step S6).

Figure 8:
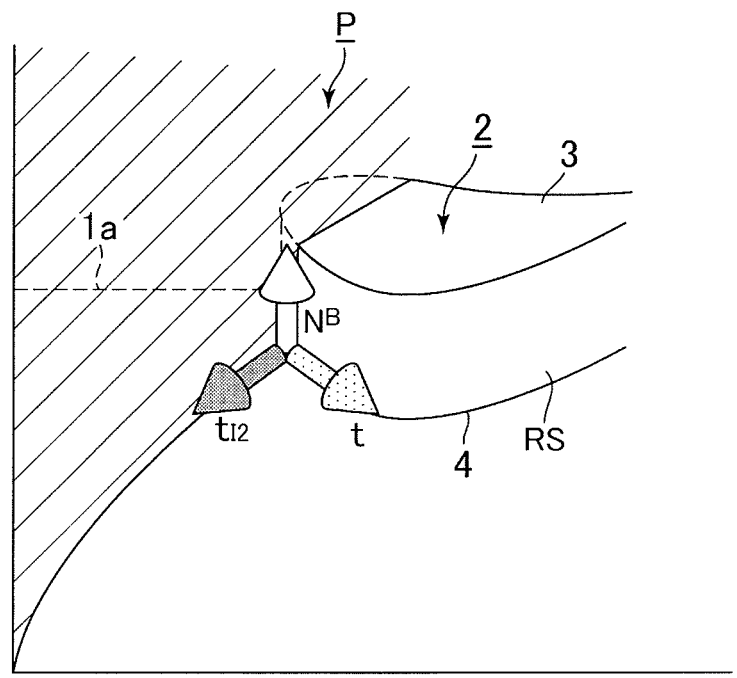
FIG. 8 is a conceptual view illustrating a relationship among the first tangent vector, a surface normal vector of an internal side of the cylinder, and the third tangent vector according to an embodiment of the present invention.

FIG. 8 is a conceptual view illustrating a relationship among the first tangent vector, a surface normal vector of the internal side of the cylinder, and the third tangent vector (unit tangent vector $t_{t2}$) according to an embodiment of the present invention. Here, a surface normal vector $N^B$ serving as a normal of the internal side surface 1a of the cylinder 1 can be expressed by Formula (7).

[Mathematical Formula 8]

$$N^B = \begin{pmatrix} \dfrac{R\cos\theta}{r} \\ 0 \\ \dfrac{\sqrt{r^2 - R^2\cos^2\theta}}{r} \end{pmatrix} \quad (7)$$

Also, since a tangent vector of an intersection line between surfaces can be derived by an outer product (vector product) of normal vectors of the two surfaces, the unit tangent vector $t_{t2}$ can be expressed by an outer product (vector product) of the first tangent vector t and the normal vector $N^B$ of the internal side surface of the cylinder as in Formula (8).

[Mathematical Formula 9]

$$t_{t2} = t \times N^B \quad (8)$$

In the above manner, the third tangent vector $t_{t2}$ at the arbitrary point on the curve C ($\theta$) is calculated (step S7).

By calculating an addition vector obtained by adding the second tangent vector to the third tangent vector at a predetermined ratio (step S8), a direction of a center point of the blade 11 of the tool to the arbitrary point on the curve C ($\theta$) can be determined.

Figure 9:
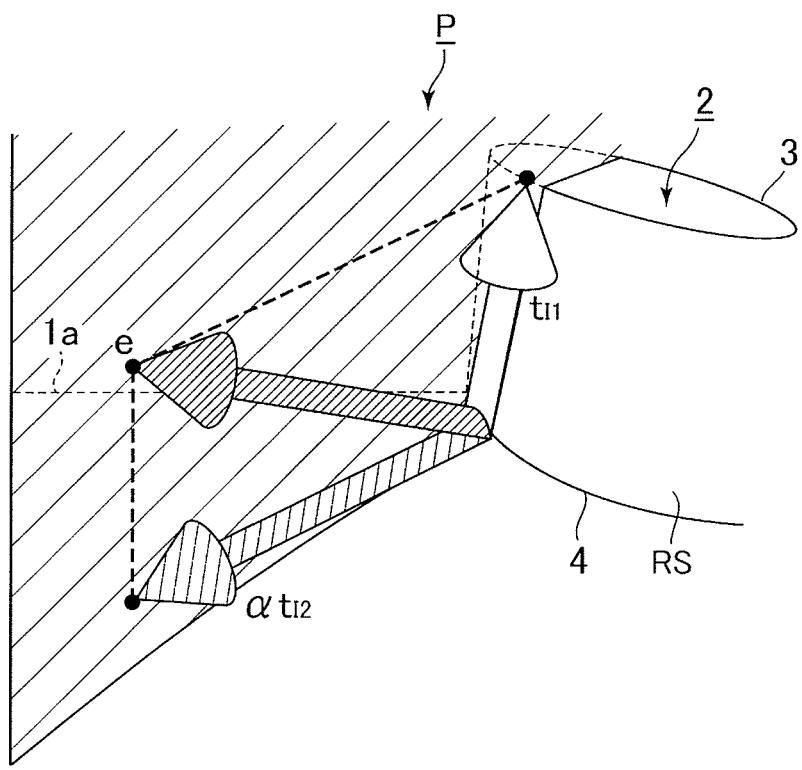
FIG. 9 is a conceptual view illustrating an addition vector according to an embodiment of the present invention.

A unit vector e, which is to be set, directed from the center point of the blade 11 of the tool to the arbitrary point on the curve C ($\theta$) can be calculated by adding the unit tangent vectors $t_{t1}$ and $t_{t2}$ (step S8). FIG. 9 is a conceptual view illustrating an addition vector according to an embodiment of the present invention. The unit vector e can be expressed by Formula (9).

[Mathematical Formula 10]

$$e = \dfrac{t_{t1} + \alpha t_{t2}}{|t_{t1} + \alpha t_{t2}|} \quad (9)$$

The value α is an arbitrary value, is a value for adjusting an angle between the unit vector e and the unit tangent vector $t_{t1}$ and an angle between the unit vector e and the unit tangent vector $t_{t2}$, and can be set to a predetermined value in advance. In a case where α of the unit vector e is 1, the unit tangent vectors $t_{t1}$ and $t_{t2}$ are equal in size, and the angle between the unit vector e and the unit tangent vector $t_{t1}$ and the angle between the unit vector e and the unit tangent vector $t_{t2}$ are equal. That is, each of the angle between the unit vector e and the unit tangent vector $t_{t1}$ and the angle between the unit vector e and the unit tangent vector $t_{t2}$ is a bisected angle of the angle between the unit tangent vector $t_{t1}$ and the unit tangent vector $t_{t2}$. A case where a direction in which the blade 11 contacts the processed part is an angle bisecting direction brings about an advantage of restricting generation of a secondary burr after deburring. In a case where the blade 11 contacts the processed part in a different direction from the angle bisecting direction, a secondary burr may be generated easily on an opposite side of a side on which the blade 11 exists.

Meanwhile, in the embodiment of the present invention, when the blade 11 is moved in the angle bisecting direction, the neck 12 of the tool and the thick internal surface 5 of the hole 2 may interfere. In this case, the value α can be adjusted manually or automatically, and the moving path of the blade 11 can be controlled to prevent a chamfering width from being changed and to prevent the neck 12 and the thick internal surface 5 from interfering with each other.

Figure 10:
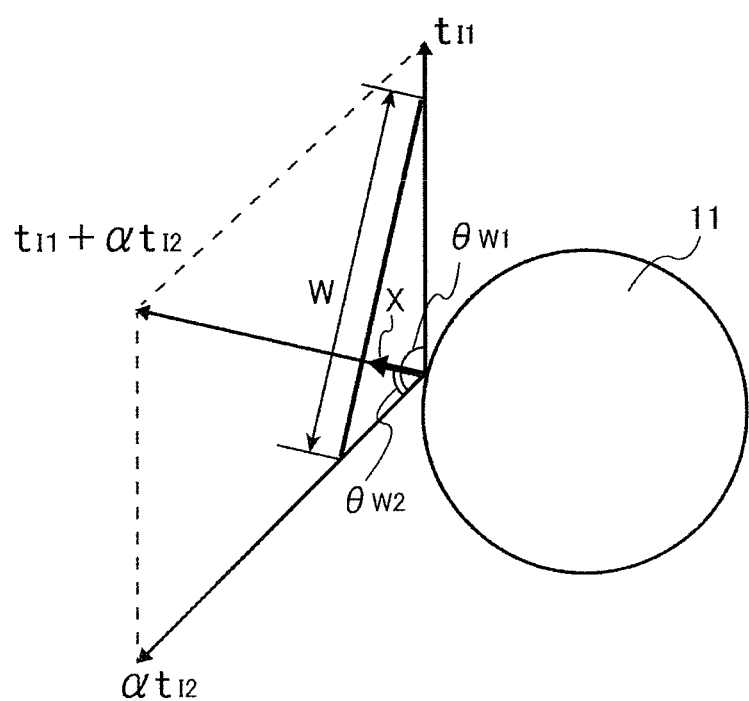
FIG. 10 is a schematic view illustrating a position of the tool in a case where a processed surface after a process has a predetermined chamfering width according to an embodiment of the present invention.

Subsequently, with use of information about the width of the processed surface input in step S3, a machining depth, which is a depth at which the tool processes the workpiece, is calculated (step S9). FIG. 10 is a schematic view illustrating a position of the tool in a case where the processed surface after a process has a predetermined chamfering width according to an embodiment of the present invention. A chamfering width W is a predetermined value and represents a width of the processed surface after chamfering.

Examples of a method for calculating the machining depth described below are the following two methods. First, a first method will be described. In a case where the angle between the unit tangent vector $t_{t1}$ and the unit vector e is $\theta_{W1}$, and in which the angle between the unit tangent vector $t_{it}$ and the unit vector e is $\theta_{W2}$, $\theta_{W1}$ can be expressed by Formulae (10) and (11).

[Mathematical Formula 11]

$$\theta_{W1} = \cos^{-1}\dfrac{t_{t1} \cdot (t_{t1} + \alpha t_{t2})}{|t_{t1} + \alpha t_{t2}|} \quad (10)$$

$$= \cos^{-1}\dfrac{1 + \alpha t_{t2} \cdot t_{t2}}{|t_{t1} + \alpha t_{t2}|} \quad (11)$$

Also, $\theta_{W2}$ can be expressed by Formulae (12) and (13).

[Mathematical Formula 12]

$$\theta_{W2} = \cos^{-1}\dfrac{t_{t2} \cdot (t_{t1} + \alpha t_{t2})}{|t_{t1} + \alpha t_{t2}|} \quad (12)$$

$$= \cos^{-1}\frac{\alpha + t_{I1} \cdot t_{I2}}{|t_{I1} + \alpha t_{I2}|} \quad (13)$$

Further, the predetermined chamfering width W can be expressed with use of a length of a machining depth δ by Formula (14).

[Mathematical Formula 13]

$$W = \delta \tan\theta_{W1} + \delta \tan\theta_{W2} \quad (14)$$

Accordingly, when Formula (14) is rewritten, in a case where α=1, the machining depth δ can be expressed by Formula (15).

[Mathematical Formula 14]

$$\delta = \frac{W}{\tan\theta_{W1} + \tan\theta_{W2}} \quad (15)$$

Accordingly, based on the chamfering width w, the machining depth at the arbitrary point on the curve C (θ) can be calculated.

Figure 18:
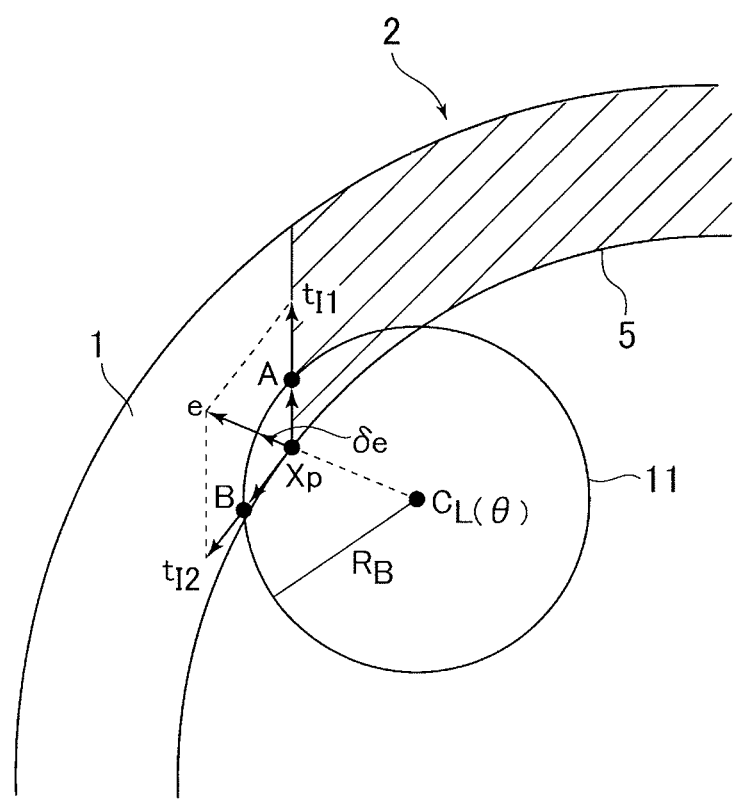
FIG. 18 is a cross-sectional view of the blade and the workpiece on a plane perpendicular to the center axis of the cylinder in a case where the cylindrical workpiece is processed by the tool.

Next, a second method will be described. By using the second method, the machining depth δ can be calculated more accurately than in the aforementioned method. FIG. 18 is a cross-sectional view of the blade and the workpiece on a plane perpendicular to the center axis of the cylinder in a case where the cylindrical workpiece is processed by the tool. In FIG. 18, a point $X_p$ is a point on the curve C (θ) to be processed in step S9. When the blade 11 performs the process with the chamfering width W, an intersection point between the thick internal surface 5 and the blade 11 is a point A while an intersection point between the internal side surface of the cylinder 1 and the blade 11 is a point B. Also, $R_B$ is a radius of the spherical blade 11, and δ is the machining depth. As is apparent from FIG. 18, coordinates $C_L$ (θ)=($x_{CL}$ (θ), $y_{CL}$ (θ), $z_{CL}$ (θ)) of the center point of the blade 11 of the tool can be expressed by Formula (16).

[Mathematical Formula 15]

$$C_L(\theta) = x_p - (R_E - \delta)e \quad (16)$$

Also, since the blade 11 is spherical, the relationship between coordinates of a point x on the surface of the blade 11 and the coordinates $C_L$ (θ) of the center point of the blade 11 of the tool can be expressed by Formula (17).

[Mathematical Formula 16]

$$|x - C_L(\theta)|^2 = R_B^2 \quad (17)$$

Meanwhile, the chamfering width W can be defined by a line segment connecting the point A to the point B. Since the point A is on a straight line extending from the point $X_p$ along the unit tangent vector $t_{I1}$, positional coordinates of the point A can be defined by Formula (18).

[Mathematical Formula 17]

$$r_1(\zeta) = x_p + \zeta t_{I1} \quad (18)$$

In this formula, ζ is an arbitrary coefficient. Also, the point A is a point on the surface of the blade 11. Thus, when $r_1$ (ζ) is substituted into x in Formula (17), Formula (19) can be obtained as a quadratic equation for ζ.

[Mathematical Formula 18]

$$\zeta^2 + 2(R_B - \delta)e \cdot t_{I1}\zeta + \delta^2 - 2\delta R_B = 0 \quad (19)$$

A solution of the quadratic equation for ζ is derived by Formula (20).

[Mathematical Formula 19]

$$\zeta = -(R_B - \delta)e \cdot t_{I1} + \sqrt{(R_B - \delta)^2(e \cdot t_{I1})^2 - (\delta^2 - 2\delta R_B)} \quad (20)$$

Similarly, since the point B is on a straight line extending from the point $X_p$ along the unit tangent vector $t_{I2}$, positional coordinates of the point B can be defined by Formula (21).

[Mathematical Formula 20]

$$r_2(\eta) = x_p + \eta t_{I1} \quad (21)$$

A solution of a quadratic equation for η, obtained by substituting $r_2$ (η) into x in Formula (17), is derived by Formula (22).

[Mathematical Formula 21]

$$\eta = -(R_S - \delta)e \cdot t_{I1} + \sqrt{(R_B - \delta)^2(e \cdot t_{I2})^2 - (\delta^2 - 2\delta R_B)} \quad (22)$$

Since each of ζ and η is a function of δ, the chamfering width W can be expressed by Formula (23).

[Mathematical Formula 22]

$$W(\delta) = |r_1(\zeta(\delta)) - r_2(\eta(\delta))| \quad (23)$$

Based on Formula (23), Formula (24) is led, and a solution of δ is derived.

[Mathematical Formula 23]

$$G(\delta) = |r_1(\zeta(\delta)) - r_2(\eta(\delta))i|^2 - w^2 = 0 \quad (24)$$

By doing so, an appropriate machining depth in a case where a value for the chamfering width W is specified, can be specified. As a method for deriving a solution of Formula (24), a Newton's method can be adopted, for example. Although an initial value for δ at the time of adopting the Newton's method is not particularly limited, δ=W/4 can be used as an initial value, for example. In this case, since a line segment $AX_p$ and a line segment $BX_p$ are equal in length, the machining depth δ at the time of performing the process in the angle bisecting direction with the chamfering width W can be derived.

Finally, with use of the information about the shape of the tool input in step S2 and the machining depth δ calculated in step S9, a position of the center point of the blade 11 of the tool is calculated (step S10). By specifying positional coordinates of the center point of the blade 11 of the tool in a reverse direction of the unit vector e from the arbitrary point on the curve C (θ) so that the workpiece may be processed to be as deep as the machining depth δ calculated in step S9, the width of the processed surface can be W input in step S3. It is to be noted that the point as a reference when the position of the tool is to be calculated is not necessarily the center point of the blade 11 of the tool but may be a specified point in the tool.

Meanwhile, even in a case where the position of the center point of the blade 11 of the tool is calculated in step S10, the neck 12 of the tool may interfere with the workpiece when the blade 11 is actually moved to the position.

Figure 19A:
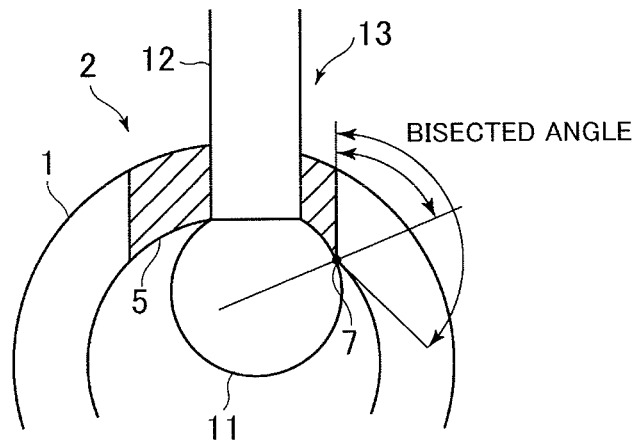
FIGS. 19(a) to 19(c) illustrate interference of the neck of the tool with the workpiece.
Figure 19B:
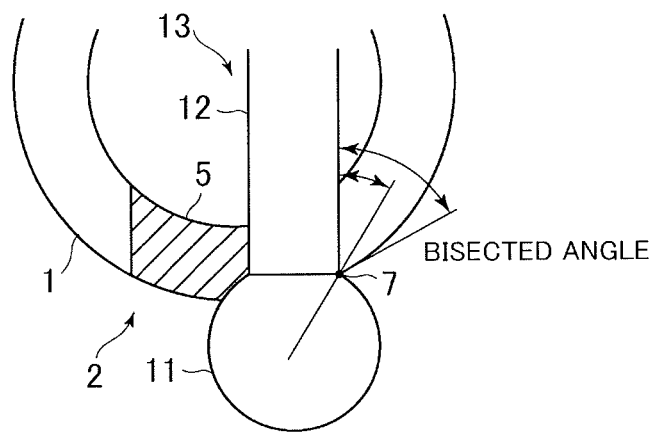
Figure 19C:
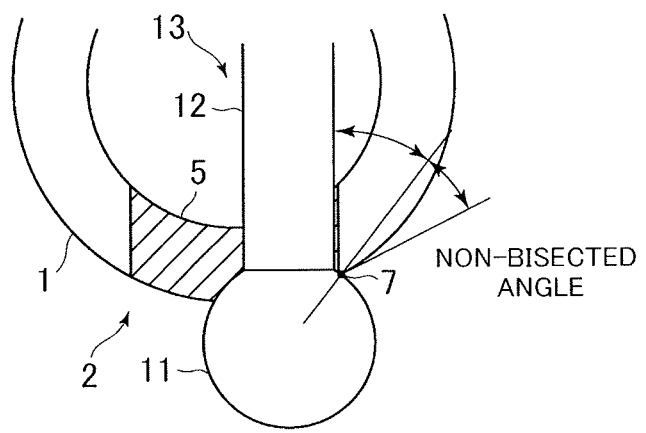

For example, FIGS. 19(a) to 19(c) illustrate interference of the neck of the tool with the workpiece. FIGS. 19(a) to 19(c) illustrate a case where the cylindrical workpiece is processed by the tool, is a cross-sectional view along a plane perpendicular to the center axis of the cylinder, and illustrates a positional relationship between the tool and the workpiece. In FIG. 19(a), an intersection line between the internal side surface and the thick internal surface 5 of the cylindrical workpiece is processed. Even in a case where the blade 11 contacts a processed part 7 in the angle bisecting direction, the neck 12 will not contact and interfere with the thick internal surface 5 of the workpiece. On the other hand, in FIG. 19(b), an intersection line between the external side surface and the thick internal surface 5 of the cylindrical workpiece is processed. In a case where the blade 11 contacts the processed part 7 in the angle bisecting direction, the neck 12 will contact and interfere with the thick internal surface 5 of the workpiece. In this case, as in FIG. 19(c), by causing the blade 11 to contact the processed part 7 in an angle non-bisecting direction, the neck 12 can be prevented from contacting and interfering with the thick internal surface 5 of the workpiece.

Figure 20:
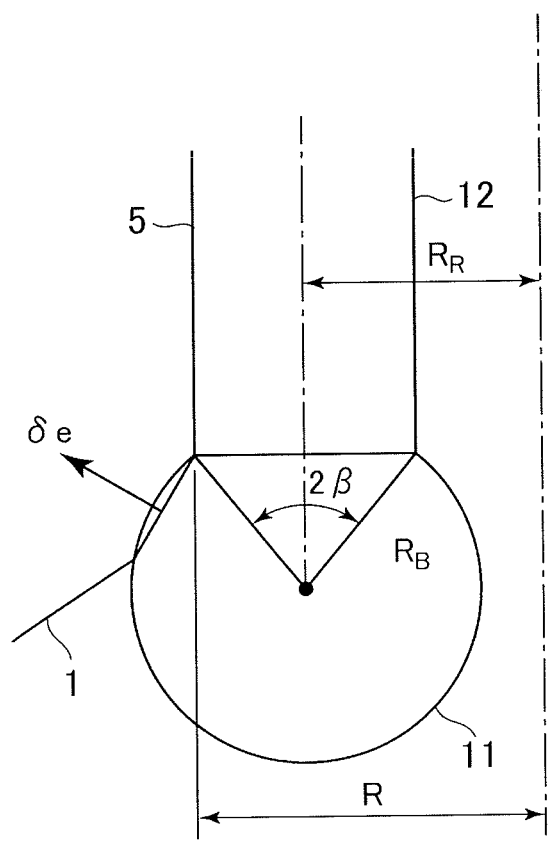
FIG. 20 illustrates a relationship among the radius of the hole, the radius of the blade, and the radius of the neck.

After the position of the center point of the blade 11 of the tool is calculated in step S10, whether or not the calculated position of the center point is located at a position generating interference is determined (step S11). FIG. 20 illustrates a relationship among the radius of the hole, the radius of the blade, and the radius of the neck. As illustrated in FIG. 20, in a case where the radius of the spherical blade is $R_B$, an isosceles triangle with the center part of the blade 11 as a vertex, with the width of the neck 12 as a base, and with the two radii $R_B$ as two sides, is defined. In this case, when the angle of the vertex is $2\beta$, the radius of the neck 12 can be defined as $R_B \sin 2\beta$. The radius of the hole is R, and $R_R = R - R_B \sin \beta$ is defined. In this case, when the x coordinate of the center point of the blade is lower than $R_R \cos \theta$, and the y coordinate is lower than $R_R \sin \theta$, no interference is generated. By setting $\alpha = 1$ and deriving the machining depth $\delta$, the positional coordinates at the center point of the blade 11 can be specified in a reverse direction of the unit vector e from the contact point. When the x coordinate of the specified center point is lower than $R_R \cos \theta$, and the y coordinate is lower than $R_R \sin \theta$, that is, when the sum of the square of the value of the x coordinate and the square of the value of the y coordinate is lower than the square of $R_R$, no interference is generated. When the sum of the square of the value of the x coordinate and the square of the value of the y coordinate is higher than the square of $R_R$, interference will be generated in the neck, and a which does not generate interference needs to be specified.

In a case where the position of the center point of the tool calculated in step S10 is determined to be a position generating interference (YES in step S11), the value of $\alpha$ is updated (step S12). For example, as a method for specifying $\alpha$ which does not generate interference, processing in which the value of $\alpha$ is changed in a small range in steps of a predetermined value from 1, and in which the sum of the square of the value of the x coordinate of the center point specified by the value of $\alpha$ and the square of the value of the y coordinate is calculated is repetitively performed until the sum of the square of the value of the x coordinate and the square of the value of the y coordinate is lower than the square of $R_R$. By doing so, $\alpha$ which does not generate interference can be specified. That is, by changing the value of $\alpha$ in a small range in steps of a predetermined value and repeating steps S8 to S12, $\alpha$ which does not generate interference can be specified. In this case, since $\alpha$ is not equal to 1, the blade 11 contacts the processed part in the angle non-bisecting direction.

Another method for specifying $\alpha$ which does not generate interference will be described. As described above, in the case where $R_R = R - R_B \sin \beta$ is defined, when the x coordinate of the center point of the blade 11 is lower than $R_R \cos \theta$, and the y coordinate is lower than $R_R \sin \theta$, no interference is generated. That is, to prevent the blade 11 from interfering with the workpiece, a center point $X_R$ of the blade 11 needs to be in a cylinder expressed by Formula (25).

[Mathematical Formula 24]

$$x(\theta)=R_R \cos \theta, y(\theta)=R_R \sin \theta, z(\theta)=z \qquad (25)$$

Meanwhile, as is apparent from Formula (9), since the vector e exists on a plane including the unit tangent vectors $t_{t1}$ and $t_{t2}$ and passes through the contact point $X_p$, this plane can be expressed by Formula (26).

[Mathematical Formula 25]

$$ax(\theta)+by(\theta)+cz(\theta)+d=0 \qquad (26)$$

In this formula, $(a, b, c)^T = t_{t1} \times t_{t2}$ is established, and $d = -t_{t1} \times t_{t2} \cdot X_p$ is established. As a matter of course, since the center point $X_R$ of the blade 11 is located on the plane expressed by Formula (26), the center point $X_R$ of the blade 11 is located in a range in which the cylinder and the plane intersect. Based on Formulae (25) and (26), the range in which the cylinder and the plane intersect can be expressed by Formula (27).

[Mathematical Formula 26]

$$C_R(\theta) = \left( R_R \cos\theta, R_R \sin\theta, -\frac{aR_R \cos\theta + bR_R \sin\theta + d}{c} \right) \qquad (27)$$

Meanwhile, positional coordinates r (u) of the position of the center point can be expressed by Formula (28) with use of the positional coordinates of a point XP on the curve C ($\theta$).

[Mathematical Formula 27]

$$r(u)=x_p+ue \qquad (28)$$

In this formula, u is a parameter. An intersection point between a line r (u) and a curve $C_R$ ($\theta$) can be expressed as a vector formula of r (u)=$C_R$ ($\theta$). This formula is an overdetermined system, and solutions of the two formulae can be derived by means of the Newton's method. In a case where $X_R=(x_R (\alpha), y_R (\alpha), z_R (\alpha))$ is defined as a formula which depends on a, conditions of Formula (29) needs to be satisfied to prevent interference.

[Mathematical Formula 28]

$$F(\alpha)=(x_p-x_R(\alpha))^2+(y_p-y_R(\alpha))^2+(z_p-z_R(\alpha))^2-(R_B-\delta)^2=0 \qquad (29)$$

In a case where the initial value for a does not satisfy Formula (29), $\alpha$ satisfying F ($\alpha$)=0 can be specified with use of a bisection method.

A further method for specifying the position of the center point of the blade 11 to prevent the tool from interfering with the workpiece is as follows. In a case where $\alpha=1$, and in a case where the sum of the square of the value of the x coordinate of the center point of the blade 11 and the square of the value of the y coordinate is higher than the square of $R_R$, a distance A between the center point of the blade 11 calculated in a case where $\alpha=1$ and the point on the curve C ($\theta$) to be processed is calculated. An intersection point between a circle centering on the point on the curve C ($\theta$) and having a radius with a length of the distance A and a range expressed by Formula (18) (a range in which plane including the unit tangent vectors $t_{r1}$ and $t_{r2}$ and the cylinder intersect) is calculated. This intersection point then can be specified as the position of the center point of the blade 11.

When the value of α is updated in step S12, the procedure returns to step S8 again. Conversely, it is determined that the position of the center point of the tool calculated in step S10 is a position generating no interference (NO in step S11), the processing in steps S5 to S11 ends.

The processing in steps S5 to S12 is repetitively executed while the value of θ is changed in a small range in a discontinuous manner in the range from 0 to 360 degrees. As a result, the tool path can be calculated. Meanwhile, in the above description, the tool path is calculated in a case where the coordinates of the intersection line of the internal side surface of the cylinder 1 with the side surface of the column 101 are derived, and in which the point on the internal side surface of the cylinder 1 is processed. However, the tool path may be calculated in a case where the coordinates of the intersection line of the external side surface of the cylinder 1 with the side surface of the column 101 are derived, and in which the point on the external side surface of the cylinder 1 is processed.

The present invention is not limited to the above embodiments. Although the hole 2 is provided perpendicularly to the cylinder 1 in the above figures, the hole 2 is not limited to one provided perpendicularly and may be one penetrating obliquely. Also, in the above embodiments, calculation has been performed with use of the precise-circular column and cylinder. However, the present invention can be applied to column and cylinder of any shape, such as an oval column and a column of a complicated shape such as a gourd shape, as long as the shape can be expressed by formulae. That is, in a case where the curve C of the secondary opening rim 4 can be expressed by a function, the first tangent vector t can be calculated by differentiating the curve C. Also, in a case where the normal vector $N_{RS}$ of the ruled surface RS can be expressed by a formula, the second tangent vector $t_{r1}$ can by calculated with use of Formula (6). Further, in a case where the surface normal vector $N^B$ can be expressed by a formula, the third tangent vector $t_{r2}$ can be calculated with use of Formula (8). That is, even in a case where the secondary opening rim 4 is a complicated curve, the present invention can be applied to the curve as long as the curve can be expressed by a function, and an appropriate path of the tool for processing can be calculated.

Meanwhile, in the above description, in steps S1 and S2, the outside diameter or the inside diameter of the cylinder 1, the diameter of the hole 2, and the positional coordinates of the center position of the hole 2 are input as information about the workpiece, and the radius of the tool sphere and the shank radius are input as information about the tool. However, when the shape of the workpiece, the shape of the hole provided in the workpiece, and the position and angle at which the hole is provided change, information to be input also changes. Hereinbelow, information to be input corresponding to several positional relationships between the curved surface and the hole will be described.

Figure 11A:
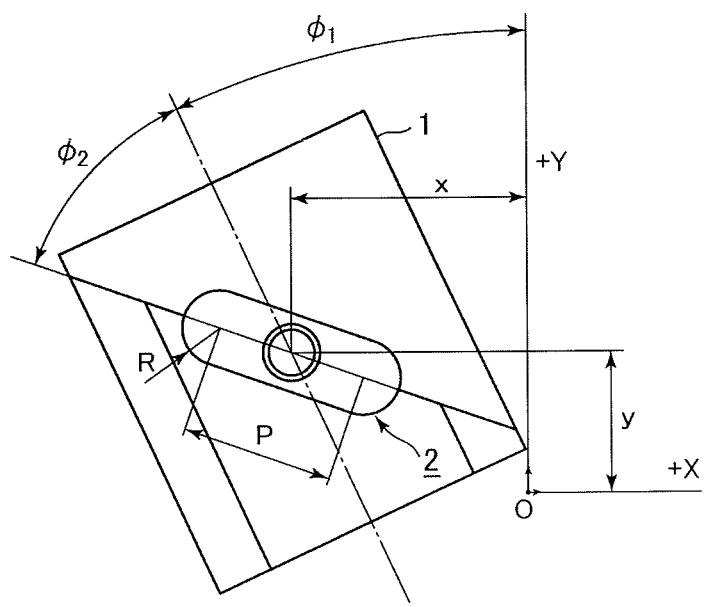
FIGS. 11(a) and 11(b) are conceptual views illustrating the workpiece and the tool in a case where the cylinder and the hole intersect according to an embodiment of the present invention.
Figure 11B:
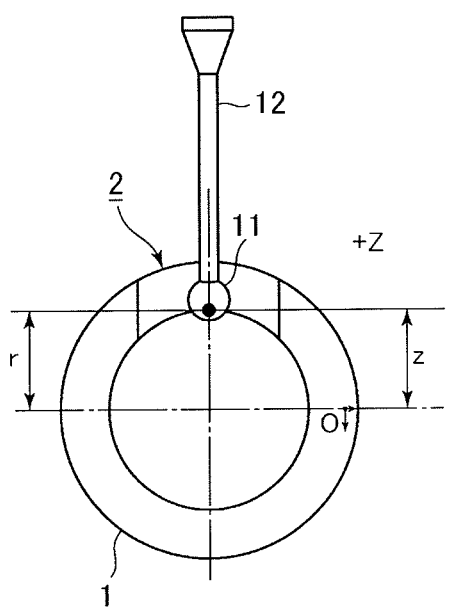

FIGS. 11(a) and 11(b) are conceptual views illustrating the workpiece and the tool in a case where the cylinder and the hole intersect according to an embodiment of the present invention. FIG. 11(a) is a front view of the cylinder as seen from a point on the center axis of the elongated hole. FIG. 11(b) is a cross-sectional view along a plane perpendicular to the center axis of the cylinder including the center axis of the elongated hole. For example, as illustrated in FIG. 11(a), in a case where the elongated hole (formed in a shape in which, on both ends of a rectangle formed approximately in a rectangular shape in the longitudinal direction, semicircles each formed approximately in a semicircular shape having a diameter with an equal length to that of the shorter side of the rectangle are connected) is provided in the cylinder perpendicularly to the ground, in which the center axis of the cylinder and the center axis of the elongated hole are perpendicular to each other, and in which the longitudinal direction of the elongated hole has a predetermined angle with respect to the center axis of the cylinder, a radius r of the hollow of the cylinder, a radius R of the semicircle of the elongated hole, a pitch P of the elongated hole, an angle $\phi_1$ of the center axis of the cylinder with respect to a Y axis extending in the up-down direction of FIG. 11(a), and an angle $\phi_2$ of the longitudinal direction of the elongated hole with respect to the center axis of the cylinder are input as information about the workpiece, and a radius $R_t$ of the tool sphere and a shank radius $R_s$ are input as information about the tool. In addition, positional coordinates x, y, and z of the center position of the elongated hole in a case where a point at which values of an X axis extending in the right-left direction of FIG. 11(a), the Y axis extending in the up-down direction of FIG. 11(a), and a Z axis extending in the up-down direction of FIG. 11(b) are all 0 is defined as an origin point O used when the program specifies coordinates are input.

Figure 12A:
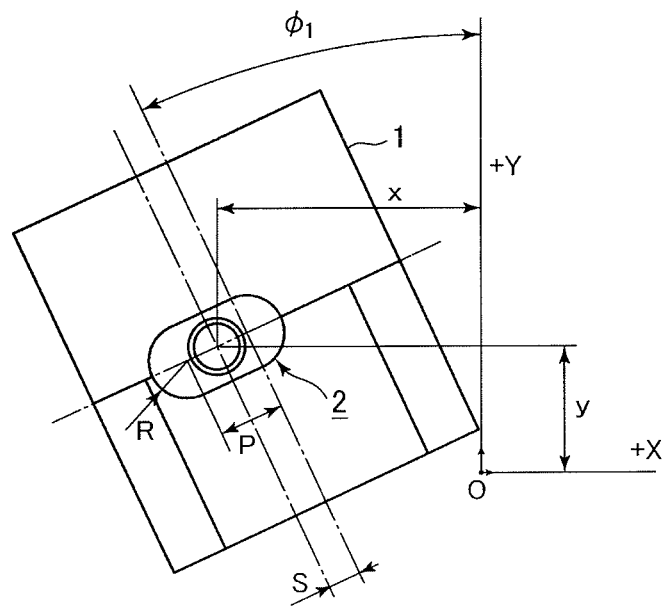
FIGS. 12(a) and 12(b) are conceptual views illustrating the workpiece and the tool in a case where the cylinder and the hole intersect according to an embodiment of the present invention.
Figure 12B:
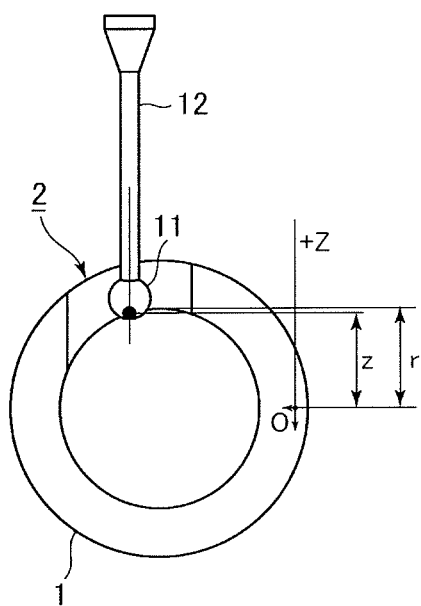

FIGS. 12(a) and 12(b) are conceptual views illustrating the workpiece and the tool in a case where the cylinder and the hole intersect according to an embodiment of the present invention. FIG. 12(a) is a front view of the cylinder as seen from a point on the center axis of the elongated hole. FIG. 12(b) is a cross-sectional view along a plane perpendicular to the center axis of the cylinder including the center axis of the elongated hole. For example, as illustrated in FIG. 12(a), in a case where the elongated hole (formed in a shape in which, on both ends of a rectangle formed approximately in a rectangular shape in the longitudinal direction, semicircles each formed approximately in a semicircular shape having a diameter with an equal length to that of the shorter side of the rectangle are connected) is provided in the cylinder perpendicularly to the ground, in which the center axis of the cylinder and the longitudinal direction of the elongated hole are perpendicular to each other, and in which the elongated hole is displaced from the center axis of the cylinder, a radius r of the hollow of the cylinder, a radius R of the semicircle of the elongated hole, a pitch P of the elongated hole, an angle $\phi_1$ of the center axis of the cylinder with respect to the Y axis extending in the up-down direction of FIG. 12(a), and a minimum distance S between the center of the elongated hole and the center axis of the cylinder are input as information about the workpiece, and a radius $R_t$ of the tool sphere and a shank radius $R_s$ are input as information about the tool. In addition, positional coordinates x, y, and z of the center position of the elongated hole in a case where a point at which values of the X axis extending in the right-left direction of FIG. 12(a), the Y axis extending in the up-down direction of FIG. 12(a), and the Z axis extending in the up-down direction of FIG. 12(b) are all 0 is defined as an origin point O used when the program specifies coordinates are input.

Figure 13A:
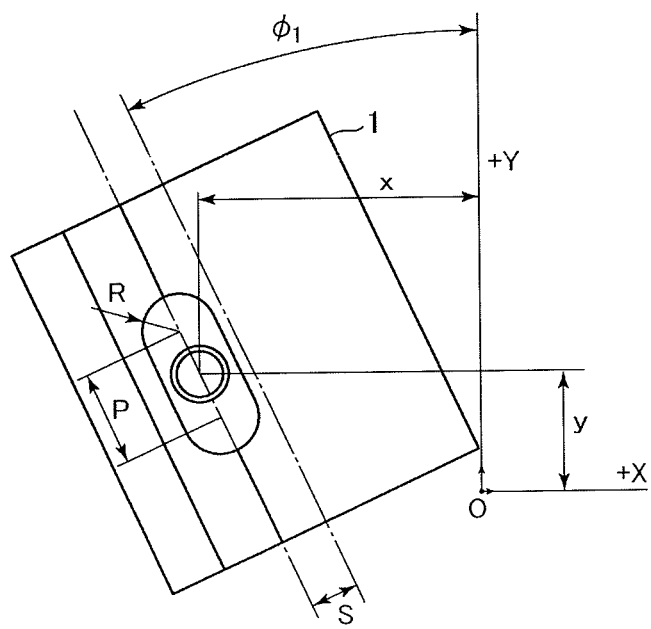
FIGS. 13(a) and 13(b) are conceptual views illustrating the workpiece and the tool in a case where the cylinder and the hole intersect according to an embodiment of the present invention.
Figure 13B:
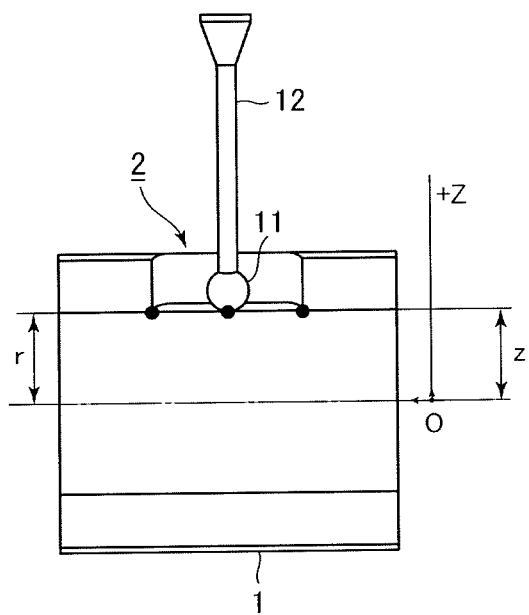

FIGS. 13(a) and 13(b) are conceptual views illustrating the workpiece and the tool in a case where the cylinder and the hole intersect according to an embodiment of the present invention. FIG. 13(a) is a front view of the cylinder as seen from a point on the center axis of the elongated hole. FIG. 13(b) is a cross-sectional view along a plane perpendicular to the center axis of the cylinder including the center axis of the elongated hole. For example, as illustrated in FIG. 13(a), in a case where the elongated hole (formed in a shape in which, on both ends of a rectangle formed approximately in a rectangular shape in the longitudinal direction, semicircles each formed approximately in a semicircular shape having a diameter with an equal length to that of the shorter side of the rectangle are connected) is provided in the cylinder perpendicularly to the ground, in which the center axis of the cylinder and the longitudinal direction of the elongated hole are perpendicular to each other, and in which the elongated hole is displaced from the center axis of the cylinder, a radius r of the hollow of the cylinder, a radius R of the semicircle of the elongated hole, a pitch P of the elongated hole, an angle $\phi_1$ of the center axis of the cylinder with respect to the Y axis extending in the up-down direction of FIG. 13(a), and a minimum distance S between the center of the elongated hole and the center axis of the cylinder are input as information about the workpiece, and a radius $R_t$ of the tool sphere and a shank radius $R_s$ are input as information about the tool. In addition, positional coordinates x, y, and z of the center position of the elongated hole in a case where a point at which values of the X axis extending in the right-left direction of FIG. 13(a), the Y axis extending in the up-down direction of FIG. 13(a), and the Z axis extending in the up-down direction of FIG. 13(b) are all 0 is defined as an origin point O used when the program specifies coordinates are input.

Figure 14A:
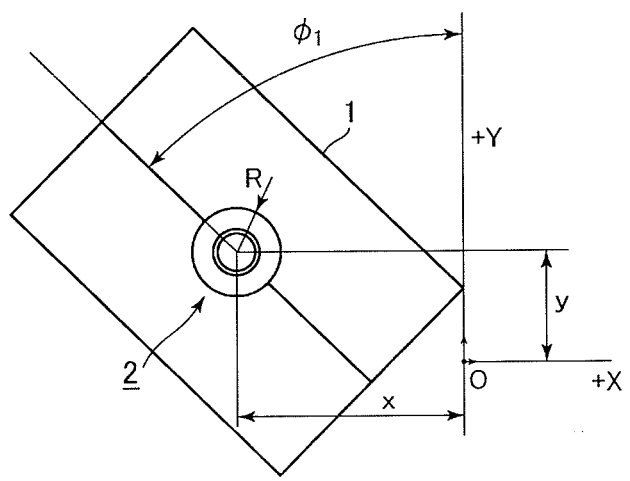
FIGS. 14(a) and 14(b) are conceptual views illustrating the workpiece and the tool in a case where the cylinder and the hole intersect according to an embodiment of the present invention.
Figure 14B:
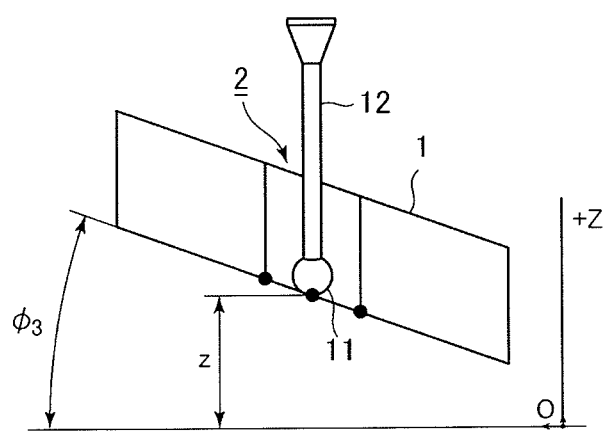

FIGS. 14(a) and 14(b) are conceptual views illustrating the workpiece and the tool in a case where the cylinder and the hole intersect according to an embodiment of the present invention. FIG. 14(a) is a front view of the cylinder as seen from a point on the center axis of the elongated hole. FIG. 14(b) is a cross-sectional view along a plane including the center axis of the cylinder. For example, as illustrated in FIG. 14(a), in a case where the cylinder is inclined against the ground at a predetermined angle, a radius R of the hole, an angle $\phi_1$ of the center axis of the cylinder with respect to the Y axis extending in the up-down direction of FIG. 14(a), and an angle $\phi_3$ of the center axis of the cylinder with respect to the XY plane in FIG. 14(b) are input as information about the workpiece, and a radius $R_t$ of the tool sphere and a shank radius $R_s$ are input as information about the tool. In addition, positional coordinates x, y, and z of the center position of the elongated hole in a case where a point at which values of the X axis extending in the right-left direction of FIG. 14(a), the Y axis extending in the up-down direction of FIG. 14(a), and the Z axis extending in the up-down direction of FIG. 14(b) are all 0 is defined as an origin point O used when the program specifies coordinates are input.

Figure 15A:
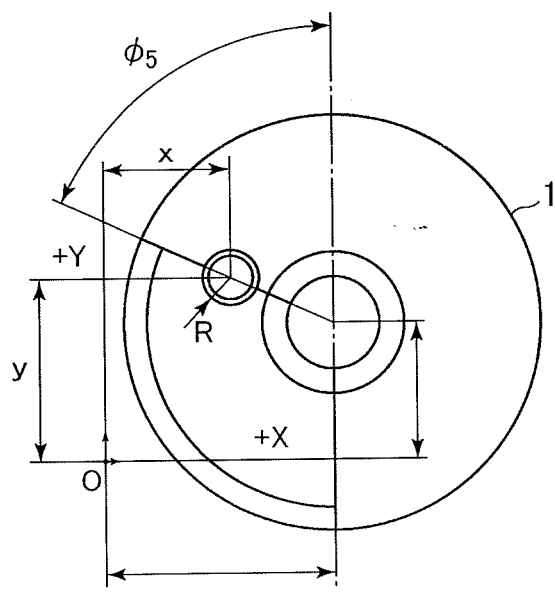
FIGS. 15(a) and 15(b) are conceptual views illustrating the workpiece and the tool in a case where a truncated cone having a primary hole and a secondary hole intersect according to an embodiment of the present invention.
Figure 15B:
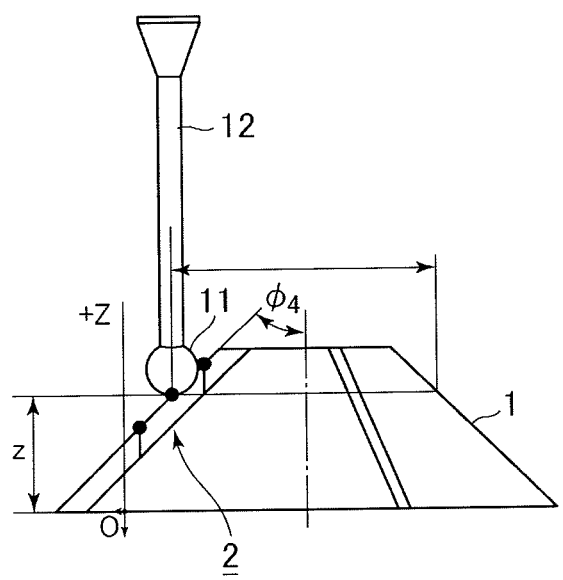

FIGS. 15(a) and 15(b) are conceptual views illustrating the workpiece and the tool in a case where a truncated cone having a primary hole and a secondary hole intersect according to an embodiment of the present invention. FIG. 15(a) is a front view as seen from a point on the center axis of the primary hole provided in the truncated cone. FIG. 15(b) is a cross-sectional view along a plane including the center axes of the primary hole and the secondary hole. For example, as illustrated in FIG. 15(a), in a case where a hole formed approximately in a precise-circular shape is provided on the side surface of the truncated cone in the vertical direction to the ground, a radius R of the secondary hole and an angle $\phi_4$ of the side surface of the truncated cone with respect to the Z axis extending in the up-down direction of FIG. 15(b) are input as information about the workpiece, and a radius $R_t$ of the tool sphere and a shank radius $R_s$ are input as information about the tool. In addition, positional coordinates x, y, and z of the center position of the elongated hole in a case where a point at which values of the X axis extending in the right-left direction of FIG. 15(a), the Y axis extending in the up-down direction of FIG. 15(a), and the Z axis extending in the up-down direction of FIG. 15(b) are all 0 is defined as an origin point O used when the program specifies coordinates are input.

Figure 16A:
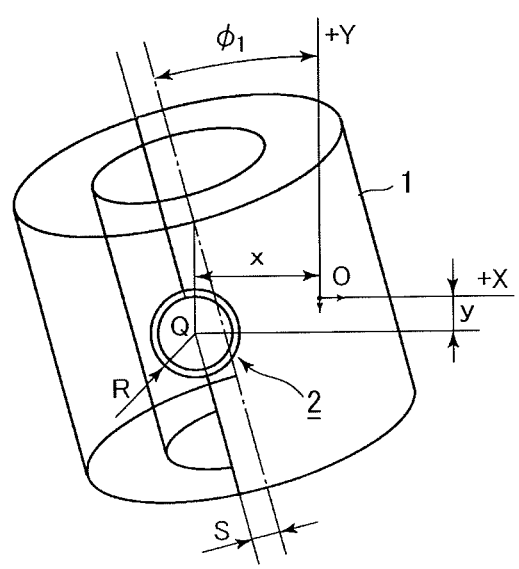
FIGS. 16(a) to 16(c) are conceptual views illustrating the workpiece and the tool in a case where the cylinder and the hole intersect according to an embodiment of the present invention.
Figure 16B:
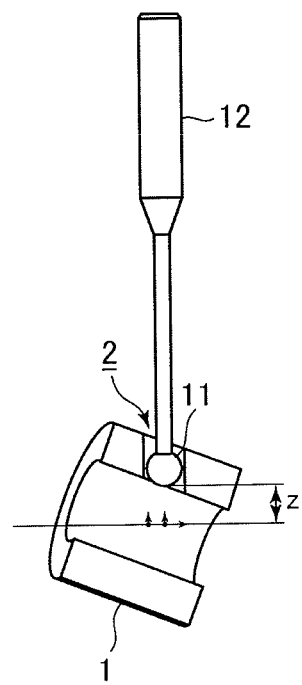
Figure 16C:
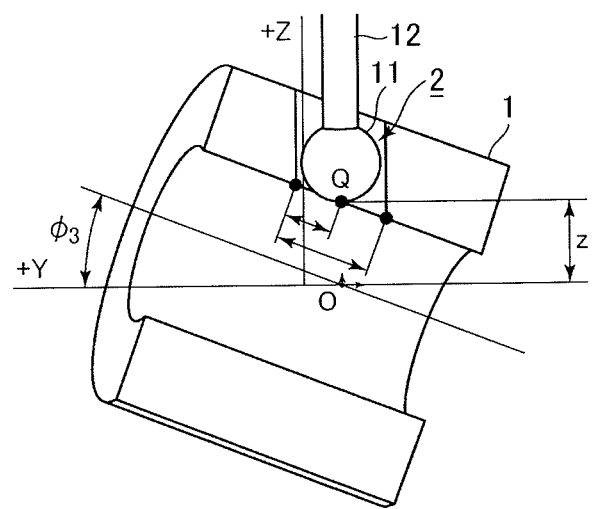

FIGS. 16(a) to 16(c) are conceptual views illustrating the workpiece and the tool in a case where the cylinder and the hole intersect according to an embodiment of the present invention. FIG. 16(a) is a front view of the cylinder as seen from a point on the center axis of the hole. FIGS. 16(b) and 16(c) are cross-sectional views along a plane parallel to the center axis of the cylinder including the center axis of the hole. For example, as illustrated in FIG. 16(a), in a case where the hole is decentered from the center axis of the cylinder, and in which the cylinder is inclined against the ground at a predetermined angle, a radius r of the cylinder, a radius R of the hole, an angle $\phi_1$ of the center axis of the cylinder with respect to the Y axis extending in the up-down direction of FIG. 16(a), an angle $\phi_3$ of the center axis of the cylinder with respect to the XY plane of FIG. 16(c), and a minimum distance S between the center of the hole and the center axis of the cylinder are input as information about the workpiece, and a radius $R_t$ of the tool sphere and a shank radius $R_s$ are input as information about the tool. In addition, positional coordinates x, y, and z of the center position of the hole in a case where a point at which values of the X axis extending in the right-left direction of FIG. 16(a), the Y axis extending in the up-down direction of FIG. 16(a), and the Z axis extending in the up-down direction of FIG. 16(c) are all 0 is defined as an origin point O used when the program specifies coordinates are input.

In the above embodiments, a case where the cylindrical workpiece having on the side surface thereof the columnar hole whose center axis is straight line which is perpendicular to the center axis of the cylinder is processed has been described. However, the present invention can be applied to a case where a workpiece having a columnar hole whose center axis is straight line which is not perpendicular to the center axis of the cylinder. Hereinbelow, described is a case where a workpiece having a cylindrical external shape and having on the side surface of the cylinder a columnar hole whose center axis is not at 90 degrees with respect to the center axis of the cylinder, but is inclined, and is straight line, not intersecting with the center axis of the cylinder is processed. That is, described is a case where a workpiece having on the side surface of the cylinder a hole inclined against the cylinder and having a decentered axis.

Figure 21:
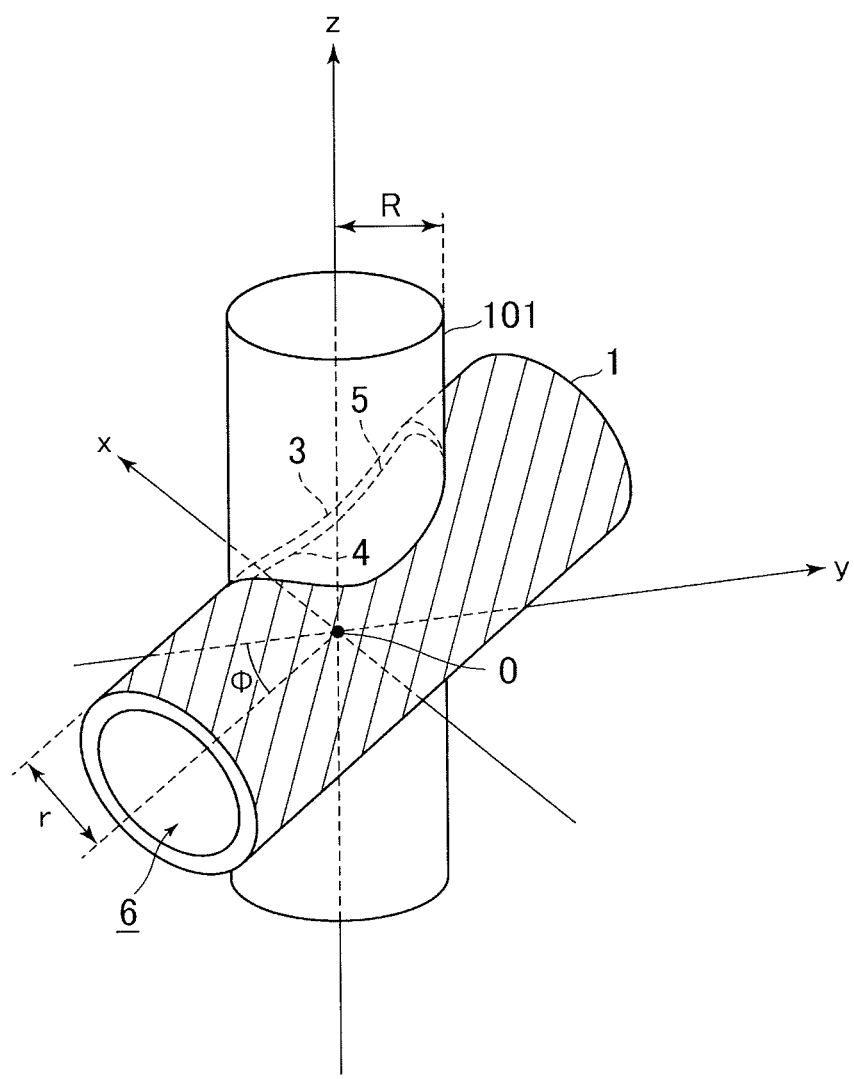
FIG. 21 is a conceptual view illustrating a state in which a cylindrical workpiece and a conceptual column forming a hole intersect according to an embodiment of the present invention.

FIG. 21 is a schematic view illustrating a state in which a cylindrical workpiece and a conceptual column forming a hole intersect according to an embodiment of the present invention. The column 101 is a conceptual column containing the hole 2 of the cylinder 1 and having a cross-section formed in an equal shape to that of the hole 2. Here, an axis along a center of a circle of the column 101 is referred to as a z axis, and a point at which the x, y, and z axes intersect is referred to as a reference point. The cylinder 1 corresponds to one obtained by moving in the direction of the x axis a cylinder (not illustrated) in which the y axis passes through a center of a circle of a bottom surface thereof and inclining the cylinder at an angle $\phi$ with the x axis as a rotation axis.

In this case, positional coordinates of an external side of the column 101 having a radius R centering on the z axis can be expressed by parametric expression using a parameter $\theta$ as in Formula (30).

[Mathematical Formula 29]

$$x_h = R\cos\theta, y_h = R\sin\theta, z_h = z_h \quad (30)$$

Meanwhile, positional coordinates of the internal side surface of the cylinder having the radius r centering on the y axis can be expressed by parametric expression using a parameter $\phi$ as in Formula (31).

[Mathematical Formula 30]

$$x_c = r\cos\alpha, y_e = y_c, z_c = r\sin\alpha \qquad (31)$$

When this cylinder is rotated at the angle $\phi$ with the x axis as a rotation axis, positional coordinates of the internal side surface of the inclined cylinder can be expressed by Formula (32).

[Mathematical Formula 31]

$$\begin{pmatrix} x_{after} \\ y_{after} \\ z_{after} \end{pmatrix} = \begin{pmatrix} 1 & 0 & 0 \\ 0 & \cos\phi & -\sin\phi \\ 0 & \sin\phi & \cos\phi \end{pmatrix} \begin{pmatrix} x_c \\ y_c \\ z_c \end{pmatrix} = \begin{pmatrix} r\cos\alpha \\ y_c\cos\phi - r\sin\alpha\sin\phi \\ y_c\sin\phi + r\sin\alpha\cos\phi \end{pmatrix} \qquad (32)$$

Additionally, when the inclined cylinder is moved in the direction of the x axis, positional coordinates of the internal side surface of the moved cylinder (that is, the cylinder 1 in FIG. 21) can be expressed by Formula (33).

[Mathematical Formula 32]

$$\begin{pmatrix} x_{after} \\ y_{after} \\ z_{after} \end{pmatrix} = \begin{pmatrix} r\cos\alpha - e \\ y_c\cos\phi - r\sin\alpha\sin\phi \\ y_c\sin\phi + r\sin\alpha\cos\phi \end{pmatrix} \qquad (33)$$

Accordingly, by substituting Formula (30) into Formula (33) to derive R sin α, yc, z coordinates of the intersection line of the internal side surface forming the cavity 6 of the cylinder 1 with the side surface of the column 101 can be derived in the following manner.

[Mathematical Formula 33]

$$z_{after} = \frac{R\sin\theta\sin\phi \pm \sqrt{r^2 - (R\cos\theta + e)^2}}{\cos\phi}$$

From the above, the curve C ($\theta$), which is the intersection line of the internal side surface of the cylinder 1 with the side surface of the column 101, can be expressed with use of the parameter $\theta$ as in Formula (34).

[Mathematical Formula 34]

$$C(\theta) = \begin{pmatrix} R\cos\theta \\ R\sin\theta \\ \dfrac{R\sin\theta\sin\phi \pm \sqrt{r^2 - (R\cos\theta + e)^2}}{\cos\phi} \end{pmatrix} \qquad (34)$$

That is, the intersection line of the internal side surface of the cylinder 1 with the side surface of the column 101 can be expressed as a function of the parameter θ in a case where the radius r of the circle forming the internal side surface of the cylinder, the radius R of the column 101, the inclination angle φ of the column, and a decentering amount e, which are initial values, are specified. Meanwhile, the center axis of the cylinder and the center axis of the hole are skew, and the decentering amount e is equal to a shortest distance between the center axis of the cylinder and the center axis of the hole. In a case where the z coordinates are high values, the z coordinates are for an intersection line located on the upper side out of the intersection line of the internal side surface of the cylinder 1 with the side surface of the column 101 in FIG. 21. In a case where the z coordinates are low values, the z coordinates are for an intersection line located on the lower side out of the intersection line of the internal side surface of the cylinder 1 with the side surface of the column 101.

In the present embodiment as well, the path calculation processing can be executed based on the flowchart of the path calculation processing illustrated in FIG. 4. As information about the workpiece input in step S1, the inclination angle φ of the column and the decentering amount e, as well as the outside diameter or the inside diameter of the cylinder 1, the diameter of the hole, and the positional coordinates of the center position of the hole, are input. Also, in step S5, the first tangent vector t at a point on the curve C (θ) is calculated with use of Formula (4). Processing in the other steps is executed in a similar manner to that described above.

Meanwhile, in the above description, the tool path is calculated in a case where the coordinates of the intersection line of the internal side surface of the cylinder 1 with the side surface of the column 101 are derived, and in which the point on the internal side surface of the cylinder 1 is processed. However, the tool path may be calculated in a case where the coordinates of the intersection line of the external side surface of the cylinder 1 with the side surface of the column 101 are derived, and in which the point on the external side surface of the cylinder 1 is processed.

(Processed Article)

Figure 22A:
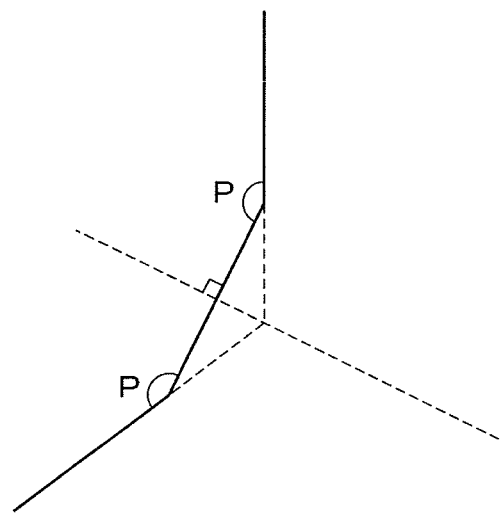
FIGS. 22(a) and 22(b) illustrate an edge portion of the processed article according to an embodiment of the present invention.

In step S8 in the flowchart of the path calculation processing illustrated in FIG. 4, in a case where the unit vector e is calculated by setting α=1, the contact direction of the blade with the processed part is an angle bisecting direction. In a processed article obtained in this case, the width of an edge portion (obtained by processing a curved processed part) is uniform. Also, as illustrated in FIG. 22(a), a processed article in which, in any curved edge portion, an angle P of a corner formed by the edge portion and one adjacent surface and an angle P of a corner formed by the edge portion and the other adjacent surface are equal can be obtained.

Figure 22B:
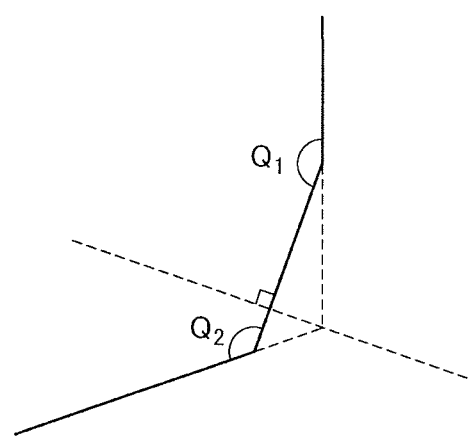

On the other hand, in step S8 in the flowchart of the path calculation processing illustrated in FIG. 4, in a case where the unit vector e is calculated by setting α=1 to avoid interference with the tool, the contact direction of the blade with the processed part is not an angle bisecting direction. Thus, the contact direction of the blade with the processed part differs depending on the position of the processed part and is not uniform. The width of the edge portion of the processed article obtained in this case is uniform. For a part for which the unit vector e is calculated by setting α=1, an angle of a corner formed by the edge portion and one adjacent surface and an angle of a corner formed by the edge portion and the other adjacent surface are equal. However, for a part for which the unit vector e is calculated by setting α≠1, as illustrated in FIG. 22(b), an angle Q1 of a corner formed by the edge portion and one adjacent surface and an angle Q2 of a corner formed by the edge portion and the other adjacent surface are not equal. However, since the value of α gradually changes, a connecting part between a part processed by the blade in the angle bisecting direction and a part processed by the blade in the angle non-bisecting direction is smooth.

(Other Embodiments of Path Calculation Program)

Although a method for calculating the tool path by performing vector calculation has been described in the above embodiments, the tool path can also be calculated by another method described below. The method mainly comprises five steps.

Hereinbelow, a case where a workpiece having on the side surface of the cylinder 1 the columnar hole 2 whose center axis is straight line which is perpendicular to the center axis of the cylinder 1 is processed as illustrated in FIG. 1 will be described. Similarly to the aforementioned embodiments, an axis along a center of a circle of the column is referred to as a z axis, an axis along a center of a circle of the cylinder 1 is referred to as a y axis, and a point at which the y axis and the z axis intersect is referred to as a reference point O (0, 0, 0). Also, an axis passing the reference point O and perpendicular to the y axis and the z axis is referred to as an x axis.

Figure 23:
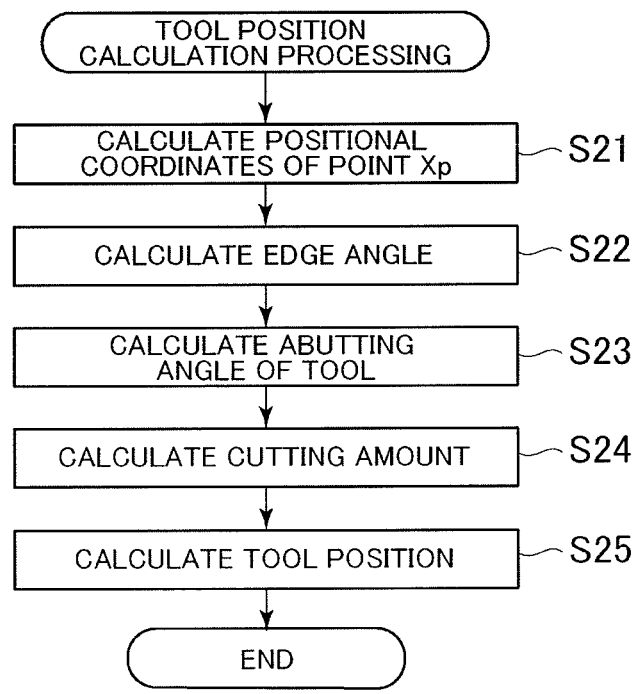
FIG. 23 is an example of a flowchart of tool position calculation processing according to an embodiment of the present invention.
Figure 24:
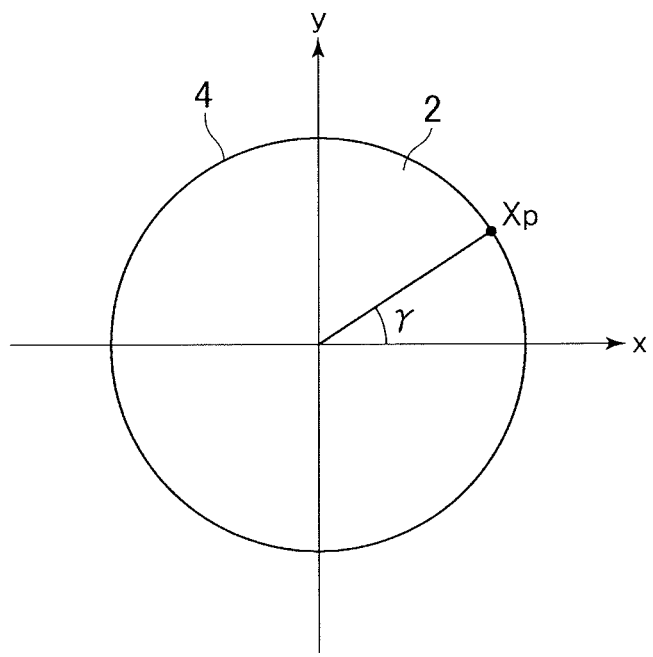
FIG. 24 is a front view of a hole provided on the side surface of the workpiece as seen along the direction of the z axis according to an embodiment of the present invention.

FIG. 23 is an example of a flowchart of tool position calculation processing according to an embodiment of the present invention. First, coordinates of each point on the opening rim 4 of the workpiece to be processed are calculated (step S21). FIG. 24 is a front view of a hole provided on the side surface of the workpiece as seen along the direction of the z axis according to an embodiment of the present invention. The coordinates of each point on the opening rim 4 can be derived with use of a trigonometric function. Here, an arbitrary point on the opening rim 4 is set as a point $X_P$ (x, y, z). As in FIG. 24, in a case where a plane including the x axis and the y axis is assumed, and in which an angle of a corner formed by intersection of a line segment connecting the point $X_P$ to the reference point with the x axis is γ, an x coordinate of the point $X_P$ can be derived by the radius and the sine of the hole 2 serving as a secondary hole, and a y coordinate can be derived by the radius and the cosine of the hole 2. A z coordinate of the point $X_P$ can be approximated by the square root of a value derived by subtracting the square of the x coordinate from the square of the radius of a primary hole. It is to be noted that the primary hole in the present description corresponds to the cavity 6 of the cylinder 1 while the secondary hole is the hole 2 penetrating from the external side surface of the cylinder 1 to the cavity 6.

[Mathematical Formula 35]

$$x = (\text{radius of secondary hole}) \times \cos \gamma \quad (35)$$

$$y = (\text{radius of secondary hole}) \times \sin \gamma \quad (36)$$

$$z = \sqrt{(\text{cutting radius of primary hole})^2 - {}^2} \quad (37)$$

Figure 25:
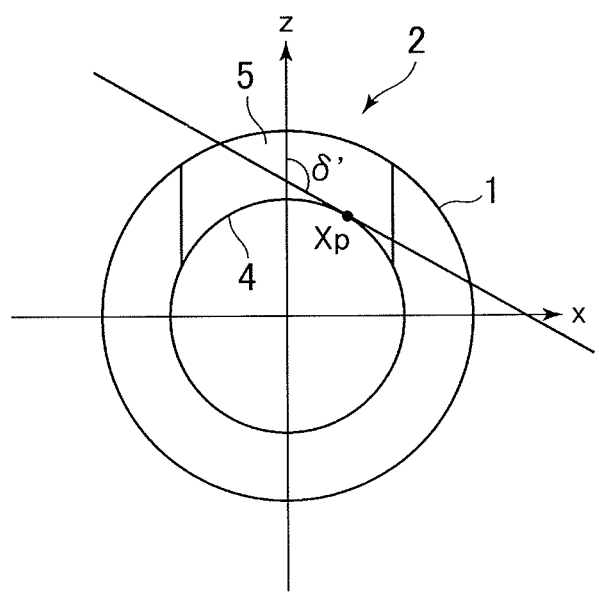
FIG. 25 is a cross-sectional view along a plane parallel to an xz plane of the workpiece according to an embodiment of the present invention.

Subsequently, an angle of a corner formed by the internal side surface (or the external side surface) of the cylinder and the thick internal surface 5 (hereinbelow referred to as an edge angle δ) at each point of the opening rim 4 is calculated (step S22). FIG. 25 is a cross-sectional view along a plane parallel to the xz plane (plane including the x axis and the z axis) of the workpiece according to an embodiment of the present invention. In a case where the secondary hole and the primary hole intersect so that the center axes thereof may be perpendicular to each other, the cross-section of the secondary hole is parallel to the z axis, and the edge angle δ thus approximates an angle δ' of the tangent to the circle representing the primary hole at the point $X_p$ with respect to the z axis. Thus, the value of the angle δ' can be the edge angle δ.

Figure 26A:
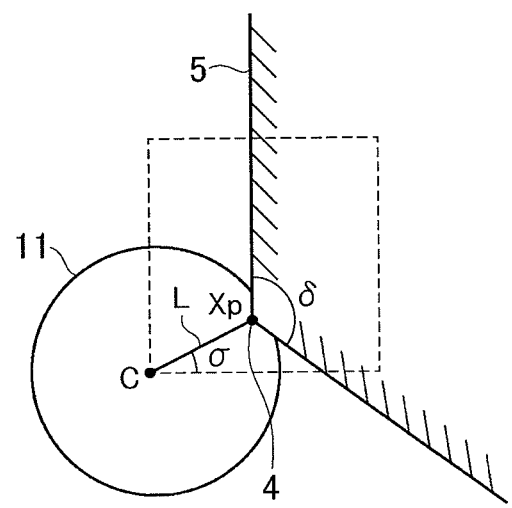
FIGS. 26(a) and 26(b) are partially enlarged views of the workpiece and the blade according to an embodiment of the present invention along a cross-section parallel to the xz plane.
Figure 26B:
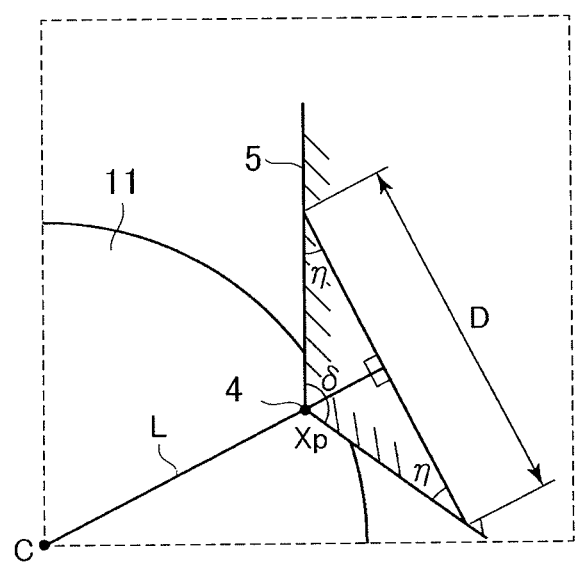

Subsequently, an abutting angle σ at which the spherical blade 11 abuts at each point on the opening rim 4 is calculated (step S23). FIGS. 26(a) and 26(b) are partially enlarged schematic views of the workpiece and the blade according to an embodiment of the present invention along a plane perpendicular to the xy plane including the z axis and a center point C of the blade 11. FIG. 26(b) is an enlarged view of a part of FIG. 26(a) circled by the dashed line. As illustrated in FIGS. 26(a) and 26(b), the abutting angle σ is an angle of a line segment L connecting the center point C of the blade 11 to the point $X_p$ with respect to a plane parallel to the xy plane (plane including the x axis and the y axis) including the center point C of the blade 11. The abutting angle σ for causing the blade 11 to contact the point $X_p$ having the edge angle δ in the angle bisecting direction can be derived by abutting angle σ=(π−edge angle δ)/2. By calculating the abutting angle σ, the direction in which the blade 11 contacts the point $X_p$ on the opening rim 4 to be processed can be specified.

Subsequently, a cutting amount (machining depth) at each point on the opening rim 4 is calculated (step S24). Here, the width of the edge portion is D, and the cutting amount in a case where the tool is inserted at the aforementioned abutting angle σ is α. Although the width of the edge is actually a part of a spherical surface of the tool, it is assumed that the width of the edge is linear.

As illustrated in FIG. 26(b), a triangle with the edge, the cross-section of the secondary hole, and the line representing the cutting angle as sides can be assumed. Here, in a case where a part of the internal angles of the triangle is η, η can be derived by Formula (38).

[Mathematical Formula 36]

$$\eta = \pi - \frac{\pi}{2} - \frac{\sigma}{2} \quad (38)$$

Also, a cutting amount δ (machining depth δ) is derived by Formula (39).

[Mathematical Formula 37]

$$\text{cutting amount } \delta = \frac{D}{2} \times \tan \eta \quad (39)$$

Finally, a position at coordinates of a specified point of the tool to be controlled by a working machine at each point on the opening rim 4 is calculated (step S25). Meanwhile, the specified point of the tool to be controlled by the working machine may be a point at coordinates of the center point C of the blade 11 of the tool or a tip end of the blade 11 of the tool. The positional coordinates of the specified point of the tool in step S25 are calculated with use of the positional coordinates, the abutting angle, and the cutting amount for the point $X_p$ calculated in steps S21 to S24.

According to the present invention, a burr of the opening rim 4 can be removed. However, to make the processed opening rim smoother and avoid unintended tool cutting, further measures are favorably taken. Smoothness of the processed opening rim depends on at which angle the blade 11 abuts the point $X_p$. To obtain a smoother opening rim, adopting the following two measures is conceived of.

One measure that is conceived of is to increase resolution. As described below, to move the blade 11 continuously for a process, it is necessary to calculate a plurality of coordinate positions of the blade 11 corresponding to different points on the opening rim 4. By calculating the coordinates, the abutting angle, and the cutting amount for each of a plurality of contact points (points $X_p$) each having a different γ value per Δγ, positions of the specified points of the blade 11 at the time of processing these contact points are calculated. By calculating these positions over the entire circumference of the opening rim 4, data for processing the entirety of the opening rim 4 can be calculated. In a case where the value for Δγ is set to be lower to calculate positions of the tool corresponding to more contact points, a smoother opening rim can be obtained after the process. The magnitude of Δγ can arbitrarily be adjusted in accordance with the lengths of the diameters of the primary hole and the secondary hole, the length of the circumference of the opening rim 4, and the like.

Another measure is to adjust the position of the blade 11 for the process. In step S25, positional coordinates of the center point C of the blade 11 or the tip end of the spherical segment part in a case where the blade 11 contacts the point $X_p$ in the angle bisecting direction can be calculated with use of the positional coordinates, the abutting angle, and the cutting amount for the point $X_p$ calculated in steps S21 to S24. The calculated positional coordinates can be adjusted.

For example, the time of starting cutting is considered. In a case where the tool is first inserted into an arbitrary point $X_p$, linearly moving the tool from the reference point O to a position to abut on the arbitrary point $X_p$ is the simplest way. However, linearly inserting the tool from the reference point O into the point $X_p$ does not mean inserting the tool along a normal plane to the curve of the opening rim 4 at the arbitrary point $X_p$. Thus, the position of the blade 11 needs to be adjusted (tool position adjuster). Meanwhile, as a matter of course, positional adjustment is also required at time other than first cutting.

Figure 27A:
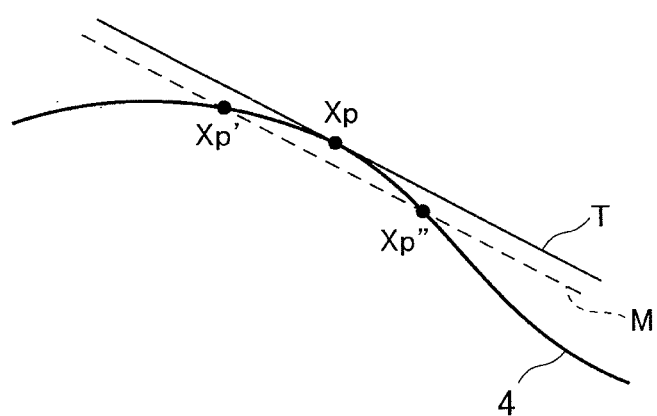
FIGS. 27(a) and 27(b) schematically illustrate a positional relationship between an opening rim of the workpiece and the blade according to an embodiment of the present invention.
Figure 27B:
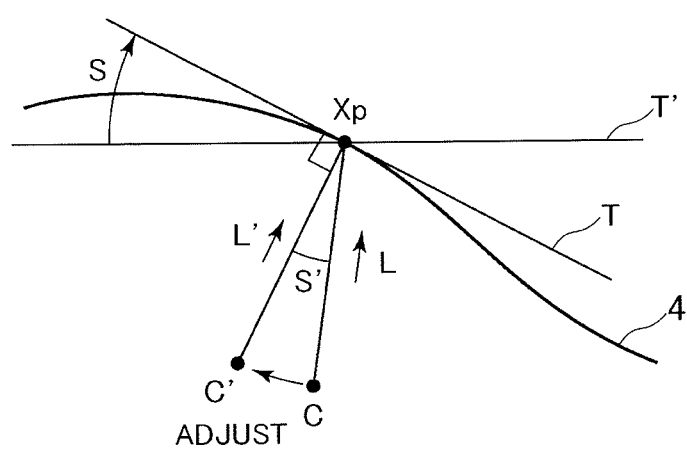

Hereinbelow, the tool position adjuster will be described. First, a tangent to the opening rim 4 at the point $X_p$ is considered. An approximate tangent is first derived based on positions of points in front of and at the back of the point $X_p$ (points each of whose γ value differs by Δγ). FIGS. 27(a) and 27(b) schematically illustrate a positional relationship between the opening rim of the workpiece and the blade according to an embodiment of the present invention. As illustrated in FIG. 27(a), a straight line which is parallel to a straight line M connecting a front point $X_p'$ on the opening rim 4 (point whose γ value is lower by Δγ than the point $X_p$) to a back point $X_p''$ on the opening rim 4 (point whose γ value is higher by Δγ than the point $X_p$) and which includes the point $X_p$ on the three-dimensional curve of the opening rim 4 can be an approximate tangent T of the opening rim 4 at the point $X_p$. When a normal plane to this approximate tangent T is derived, and the position of the blade 11 is adjusted so that the center point of the blade 11 may pass on this normal plane, unintended cutting can be avoided, and the processed opening rim can be smooth. In this manner, by deriving the normal plane to the approximate tangent T, the position of the center point of the blade 11 can be adjusted without performing complicated calculation for deriving the normal plane to the tangent T.

Figure 30:
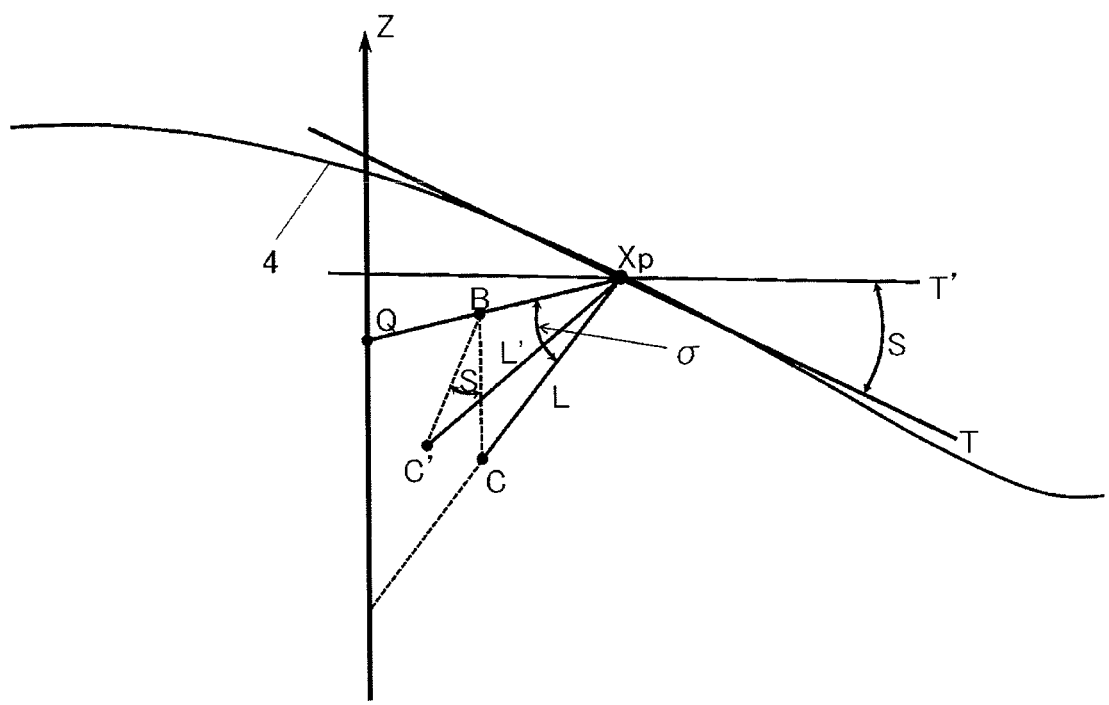
FIG. 30 schematically illustrates a positional relationship between the tangent of the opening rim and the center point of the blade in the workpiece according to an embodiment of the present invention.

Adjustment of the center point of the blade 11 can be considered with reference to the line segment L drawn from the center point C to the point $X_p$. A straight line T' in FIG. 27(b) is a straight line parallel to the xy plane and perpendicular to the line segment L. FIG. 30 schematically illustrates a positional relationship between the tangent of the opening rim and the center point of the blade in the workpiece according to an embodiment of the present invention.

A straight line obtained by moving the line segment L on the approximate normal plane to the approximate tangent T passing the point $X_p$ based on an angle S (also referred to as an inclination S) between the approximate tangent T and the xy plane while keeping a length thereof is a straight line L'. A case where a perpendicular line is drawn from the point $X_p$ to the Z axis is considered. When a T-shaped graphic formed by the line segment L and the straight line T is rotated at the angle S, the perpendicular line can overlap with a T-shaped graphic formed by the line segment L' and the straight line L'. When an intersection point between this perpendicular line (hereinbelow referred to as a line segment $X_pQ$) and the z axis is Q, and the adjusted center point is C', an angle between a $QX_pC$ plane (plane including the point Q, the point $X_p$, and the point C) and a $QX_pC'$ plane (plane including the point Q, the point $X_p$, and the point C') is S. Note that the perpendicular line is parallel to the xy plane. The line segment L' is a straight line connecting the adjusted center point C' to the point $X_p$. Thus, by deriving a moving amount from the center point C to the point C' in each of the x, y, and z coordinates based on the value for the angle S, positional coordinates of the adjusted center point C' can be specified. The moving amount from the center point C to the point C' in each of the x, y, and z coordinates can be derived by the following method, for example. Here, an intersection point, in a case where a perpendicular line is drawn from the center point C to the line segment $X_pQ$, between the perpendicular line and the line segment $X_pQ$ is defined as a point B. Distances between the point B and the point C and between the point B and the point C' (defined as Δz) can be calculated with use of a trigonometric function based on the length of the straight line L and the abutting angle σ. As described above, since the angle formed by the $QX_pC$ plane and the $QX_pC'$ plane is S, the sine of the distance Δz between the point B and the point C' is the sum of the moving amount from the center point C to the center point C' in the x axis and the moving amount from the center point C to the center point C' in the y axis (that is, the moving amount from the center point C to the center point C' projected to the xy plane). Based on the angle γ used to specify positional coordinates of the point $X_p$, the cosine of the moving amount from the center point C to the center point C' projected to the xy plane can be specified as the moving amount in the x coordinate, and the sine thereof can be specified as the moving amount in the y coordinate. Also, as for the z coordinate, the difference between Δz and the cosine of Δz can be specified as the moving amount in the z coordinate.

Figure 28:
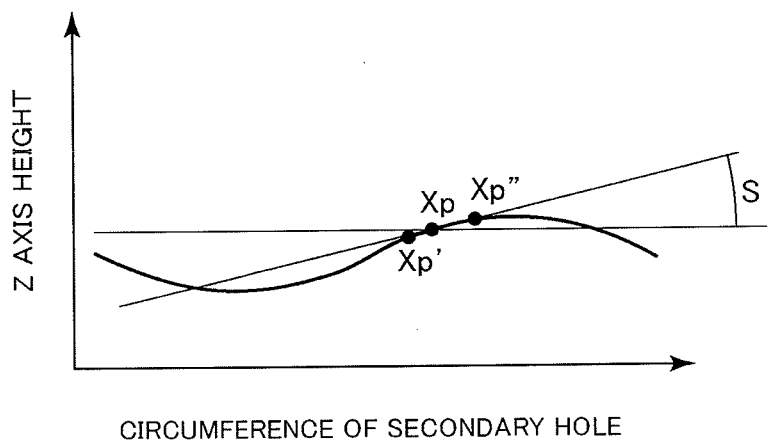
FIG. 28 is a graph of the respective plotted points on the opening rim with the circumference of a secondary hole represented on the horizontal axis and the value of a z coordinate represented on the vertical axis according to an embodiment of the present invention.

Further, the following two methods for deriving the approximate normal plane can be raised. One is a method in which an inclination at the arbitrary point $X_p$ on the opening rim 4 is approximated by a two-dimensional plane. FIG. 28 is a graph of the respective plotted points on the opening rim 4 with the circumference of the secondary hole (or the angle γ from the x axis on the xy plane seen from the upper side of the secondary hole) represented on the horizontal axis and the value of the z coordinate represented on the vertical axis. The inclination at the arbitrary point $X_p$ is derived in the above manner to derive the inclination S against the xy plane (a differential equation may be used in a case where the curve can be approximated by a function). The line segment L connecting the center point C to the point $X_p$ is adjusted as much as the inclination S. Thus, a plane including the line segment L' connecting the adjusted center point C' to the point $X_p$ is used as the approximate normal plane.

Figure 29:
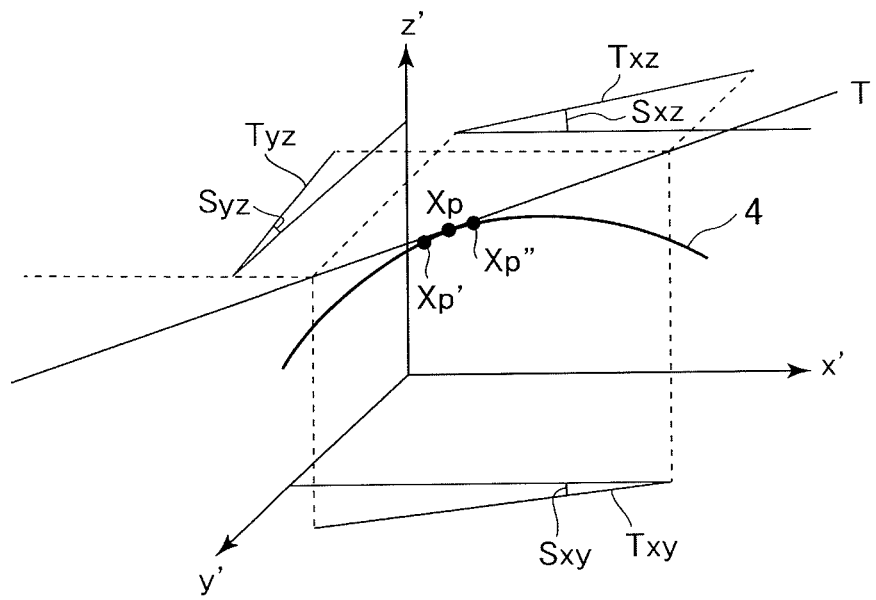
FIG. 29 illustrates a state in which an approximate tangent T is projected on an xy plane, the xz plane, and a yz plane according to an embodiment of the present invention.

The other method for deriving the approximate normal plane is a method in which the curve on the opening rim 4 is projected to derive angles on projected surfaces. FIG. 29 illustrates a state in which the approximate tangent T is projected on the xy plane, the xz plane, and the yz plane. As illustrated in FIG. 29, the approximate tangent T at the arbitrary point $X_p$ on the opening rim 4 is derived and projected on the xy plane, the xz plane, and the yz plane to derive angles ($S_{xy}$, $S_{xz}$, $S_{yz}$) of line segments $T_{xy}$, $T_{xz}$, and $T_{yz}$ projected on the respective planes with respect to the x, y, and z axes. By using these angles, the line segment L connecting the center point C of the blade 11 to the point $X_p$ is adjusted. A plane including the adjusted center point C' and the point $X_p$ is used as the approximate normal plane.

In calculation of the an actual tool path, the above methods are combined in accordance with the workpiece to calculate an optimal path. For example, first, the inclination S of the tangent at the arbitrary point $X_p$ is derived. Subsequently, the normal plane is derived from the inclination S of the tangent. Subsequently, a position which is located on the normal plane and in which the center point C of the blade 11 is located in the angle bisecting direction is calculated.

In general, the position of the center point C of the blade 11 of the tool before the process is started is set to a position at which the x and y coordinates are (0, 0). The position of the center point C of the blade 11 in the z coordinate is arbitrary. From the position, the process is started by moving the tool so that the surface of the blade 11 may contact any point on the opening rim. First, on a plane including the point $X_p$ and the z axis, the center point C of the tool is calculated at a position in the angle bisecting direction from the point $X_p$. When the blade 11 is to be inserted in the angle bisecting direction from this position toward the point $X_p$, the blade 11 may cut a position which is not supposed to be cut. The inclination of the approximate tangent T of the opening rim is set to S, and coordinates of the center point C of the blade 11 are adjusted to the center point C' with use of a trigonometric function. As a result, the center point C' can be moved to a normal plane of the approximate tangent (referred to as an approximate normal plane) at the point $X_p$. By inserting the blade 11 in the direction of the line segment L' connecting the center point C' to the point $X_p$, unintended cutting can be avoided without significantly changing the cutting direction from the angle bisecting direction of the opening rim 4.

Meanwhile, steps S22 to S24 can be omitted as needed. In a case where the blade 11 does not need to contact and process the processed part in the angle bisecting direction, and in which the chamfering width does not need to be uniform, all that is required is to bring the tool into contact. Accordingly, predetermined abutting angle and cutting amount can be used, and the position of the tool can be calculated by omitting steps S22 to S24.

Further, to calculate the position of the tool, a simpler method can be adopted instead of the aforementioned methods. For example, as a basic idea, the path of the center point C of the blade is projected on the XY plane as seen in the direction of the Z axis, the path is in a circular shape. In this case, by displacing the center point C from the positional coordinates of the point $X_p$ toward the center of the secondary hole along the angle bisecting direction at the point $X_p$ so that the distance from the point $X_p$ may be as long as the radius of the spherical blade, the positional coordinates of the center point C can tentatively be determined with use of a trigonometric function using the angle θ. The z coordinate of the center point C can be adjusted by multiplying a part of the tentatively-determined equation expressed by the trigonometric function by a coefficient. This coefficient can arbitrarily be adjusted in accordance with the ratio of the radius of the primary hole to the radius of the secondary hole so that the cutting amount can be adjusted to cause the chamfering width to be uniform.

Meanwhile, steps S22 to S24 can be omitted as needed. In a case where the blade 11 does not need to contact and process the processed part in the angle bisecting direction, and in which the chamfering width does not need to be uniform, all that is required is to bring the tool into contact. Accordingly, predetermined abutting angle and cutting amount can be used, and the position of the tool can be calculated by omitting steps S22 to S24.

REFERENCE SIGNS LIST 1 cylinder
11 blade
12 neck
13 tool
2 hole
3 primary opening rim
4 secondary opening rim
5 thick internal surface
6 cavity
7 processed part

The invention claimed is:

1. A path calculation apparatus for calculating a tool path for processing a curved processed part formed by a hole provided in a curved-surface-shaped workpiece, comprising:
　　a workpiece shape information inputter configured to input workpiece shape information about a shape of the workpiece and a shape of the curve;
　　a tool shape information inputter configured to input tool shape information about a shape of the tool;
　　a first tangent vector calculator configured to calculate a first tangent vector to the curve at a specified point on the curve;
　　an addition vector calculator configured to calculate an addition vector obtained by adding a second tangent vector, of an intersection line of a normal plane to the first tangent vector and including the specified point with a thick internal surface of a hole, to a third tangent vector, of an intersection line of the normal plane with the curved surface, at a predetermined ratio;
　　a tool position calculator configured to calculate the tool position that is located on a straight line extending from the specified point and including the calculated addition vector, and enables the specified point to be processed by the tool based on the input tool shape information, and
　　a processor configured to process the curved processed part formed by a hole provided in the curved-surface-shaped workpiece,
　　wherein the tool position calculator calculates the tool position with a plurality of points on the curve set as specified points to calculate the tool path.

2. The path calculation apparatus according to claim 1, wherein the predetermined ratio for adding the second tangent vector to the third tangent vector is 1:1.

3. The path calculation apparatus according to claim 1, comprising:
　　a width information inputter configured to input information about a width of a processed surface to be formed after being processed at the specified point; and
　　a machining depth specifier configured to specify a machining depth by the tool based on an angle formed by the second tangent vector and the third tangent vector and the input information about the width, wherein the tool position calculator calculates the tool position that is located on the straight line extending from the specified point and including the calculated addition vector based on the machining depth specified by the machining depth specifier.

4. The path calculation apparatus according to claim 1, comprising:
a position determiner configured to determine whether or not the tool position calculated by the tool position calculator is in a range in which interference between the workpiece and the tool is generated; and
a ratio updater configured to update the predetermined ratio in a case where it is determined by the position determiner that the tool position calculated by the tool position calculator is in the range in which interference between the workpiece and the tool is generated,
wherein the addition vector calculator calculates the addition vector by adding the second tangent vector to the third tangent vector at the predetermined ratio updated by the ratio updater.

5. The path calculation apparatus according to claim 1, wherein the workpiece has a cylindrical external shape and has on a side surface of the workpiece a columnar hole whose center axis is straight line which is perpendicular to a center axis of the cylinder, and
the workpiece shape information includes information about an outside diameter or an inside diameter of the cylinder and a diameter of the hole.

6. The path calculation apparatus according to claim 1, wherein the workpiece has a cylindrical external shape and has on a side surface of the cylinder a columnar hole,
the columnar hole is at an angle inclined against a center axis of the cylinder, and
the workpiece shape information includes information about an outside diameter or an inside diameter of the cylinder, a diameter of the hole, and information about an inclination angle of the column.

7. The path calculation apparatus according to claim 1, wherein the workpiece has a cylindrical external shape and has on a side surface of the cylinder a columnar hole,
the columnar hole has a center axis which is straight line, not intersecting with a center axis of the cylinder, and
the workpiece shape information includes information about an outside diameter or an inside diameter of the cylinder, a diameter of the hole, and information about a decentering amount, which is a shortest distance between the center axis of the cylinder and the center axis of the hole.

8. The path calculation apparatus according to claim 1, wherein the workpiece has a cylindrical external shape and has on a side surface of the cylinder a columnar hole,
the apparatus comprising:
a specified point position calculator configured to calculate a position of the specified point on the curve based on the input workpiece shape information;
an edge angle calculator configured to calculate an angle of an edge corner formed by the columnar hole at the specified point on the curve and the side surface of the cylinder based on the input workpiece shape information; and
a contact direction specifier configured to specify a direction in which the tool is to contact the specified point on the curve based on the angle of the edge corner calculated by the edge angle calculator, and
the tool position calculator calculates the tool position enabling the specified point to be processed by the tool based on the input tool shape information and the direction specified by the contact direction specifier.

9. The path calculation apparatus according to claim 8, comprising:
a machining width inputter configured to input a machining width at the specified point on the curve; and
a machining depth specifier configured to specify a machining depth in a case of adopting the width input by the machining width inputter based on the direction in which the tool is to contact the specified point on the curve specified by the contact direction specifier,
wherein the tool position calculator calculates the tool position enabling the specified point to be processed by the tool based on the machining depth specified by the machining depth specifier.

10. The path calculation apparatus according to claim 1, the tool comprising:
a neck; and
a blade connected to a tip end of the neck and formed in a spherical shape,
wherein, in a case where an angle formed by a line segment connecting a center of the spherical shape of the blade to a tip end of the blade residing on an extension of a center axis of the neck and a line segment connecting the center of the spherical shape of the blade to a point on a surface of the blade is defined, the neck and the blade are connected in a range from a position at which the angle is 0 degrees to a position at which the angle is 137.5 degrees or more on the surface of the blade, and
wherein a ratio r/R of a radius r of the neck to a radius R of the blade formed in the spherical shape is 0.3 to 0.8.

11. The path calculation apparatus according to claim 1, the processed article having a curved-surface external shape and having a curved edge portion formed by a hole provided in the curved surface,
wherein a width of the edge portion is uniform, and an angle of a corner formed by the edge portion and a first adjacent surface and an angle of a corner formed by the edge portion and a second adjacent surface are equal.

12. The path calculation apparatus according to claim 11, the processed article partially having a part in which the angle of the corner formed by the edge portion and the first adjacent surface and the angle of the corner formed by the edge portion and the second adjacent surface are not equal.

13. A processing apparatus for processing a workpiece by moving a tool based on a path calculated with a path calculation apparatus for calculating a tool path for processing a curved processed part formed by a hole provided in a curved-surface-shaped workpiece, the path calculation apparatus comprising:
a workpiece shape information inputter configured to input workpiece shape information about a shape of the workpiece and a shape of the curve;
a tool shape information inputter configured to input tool shape information about a shape of the tool;
a first tangent vector calculator configured to calculate a first tangent vector to the curve at a specified point on the curve;
an addition vector calculator configured to calculate an addition vector obtained by adding a second tangent vector, of an intersection line of a normal plane to the first tangent vector and including the specified point with a thick internal surface of a hole, to a third tangent vector, of an intersection line of the normal plane with the curved surface, at a predetermined ratio;

a tool position calculator configured to calculates the tool position that is located on a straight line extending from the specified point and including the calculated addition vector, and enables the specified point to be processed by the tool based on the input tool shape information, and a processor configured to process the curved processed part formed by a hole provided in the curved-surface-shaped workpiece, wherein the tool position calculator calculates the tool position with a plurality of points on the curve set as specified points to calculate the tool path.

14. A path calculation method for calculating in a computer apparatus a tool path for processing a curved processed part formed by a hole provided in a curved-surface-shaped workpiece, comprising:

inputting workpiece shape information about a shape of the workpiece and a shape of the curve;

inputting tool shape information about a shape of the tool;

calculating a first tangent vector to the curve at a specified point on the curve;

calculating an addition vector obtained by adding a second tangent vector, of an intersection line of a normal plane to the first tangent vector and including the specified point with a thick internal surface of a hole, to a third tangent vector, of an intersection line of the normal plane with the curved surface, at a predetermined ratio;

calculating a tool position that is located on a straight line extending from the specified point and including the calculated addition vector, and enables the specified point to be processed by the tool based on the input tool shape information, and processing the curved processed part formed by a hole provided in the curved-surface-shaped workpiece, wherein the calculating the tool position is calculating the tool position with a plurality of points on the curve set as specified points to calculate the tool path.

15. A processing system for calculating a tool path for processing a curved processed part formed by a hole provided in a curved-surface-shaped workpiece, controlling the tool path in accordance with the calculated path, and processing the workpiece, the system comprising:

a workpiece shape information inputter configured to input workpiece shape information about a shape of the workpiece and a shape of the curve;

a tool shape information inputter configured to input tool shape information about a shape of the tool;

a first tangent vector calculator configured to calculate a first tangent vector to the curve at a specified point on the curve;

an addition vector calculator configured to calculate an addition vector obtained by adding a second tangent vector, of an intersection line of a normal plane to the first tangent vector and including the specified point with a thick internal surface of a hole, to a third tangent vector, of an intersection line of the normal plane with the curved surface, at a predetermined ratio; and a tool position calculator configured to calculate the tool position that is located on a straight line extending from the specified point and including the calculated addition vector, and enables the specified point to be processed by the tool based on the input tool shape information, wherein the tool position calculator calculates the tool position with a plurality of points on the curve set as specified points to calculate the tool path, the system further comprises a processor configured to process the workpiece by controlling the tool path in accordance with the calculated path, the tool includes a neck and a blade connected to a tip end of the neck, and the blade has a spherical segment part formed in a shape in which the sphere is partially cut by a surface.

* * * * *